United States Patent
Debut et al.

(10) Patent No.: US 7,534,055 B2
(45) Date of Patent: May 19, 2009

(54) LOW POLARISATION MODE DISPERSION (PMD) OPTICAL FIBER LINK, AND METHOD OF MAKING THE SAME

(75) Inventors: Alexis Debut, Milan (IT); Francesco Sartori, Milan (IT); Martino Travagnin, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/584,988

(22) PCT Filed: Dec. 16, 2004

(86) PCT No.: PCT/EP2004/053545
§ 371 (c)(1), (2), (4) Date: Mar. 1, 2007

(87) PCT Pub. No.: WO2005/064370
PCT Pub. Date: Jul. 14, 2005

(65) Prior Publication Data
US 2007/0217744 A1    Sep. 20, 2007

(30) Foreign Application Priority Data
Dec. 30, 2003    (WO) .............. PCT/EP03/51118
Apr. 14, 2004    (WO) .............. PCT/EP2004/050521

(51) Int. Cl.
G02B 6/255    (2006.01)
G02B 6/02    (2006.01)
(52) U.S. Cl. ................................ 385/95; 385/123
(58) Field of Classification Search ............... 65/385; 385/95–99, 123
See application file for complete search history.

(56) References Cited

U.S. PATENT DOCUMENTS

| | | | |
|---|---|---|---|
| 4,504,300 A | 3/1985 | Gauthier et al. | |
| 4,969,941 A | 11/1990 | Kyoto et al. | |
| 5,114,338 A | 5/1992 | Tsuchiya et al. | |
| 5,316,562 A | 5/1994 | Smithgall et al. | |
| 5,418,881 A | 5/1995 | Hart, Jr. et al. | |
| 5,613,028 A | 3/1997 | Antos et al. | |
| 5,704,960 A * | 1/1998 | Evans et al. | 65/402 |
| 5,822,487 A * | 10/1998 | Evans et al. | 385/123 |

(Continued)

FOREIGN PATENT DOCUMENTS

EP    1 136 850 A1    9/2001

(Continued)

OTHER PUBLICATIONS

Galtarossa et al., "PMD Statistical Properties of Constantly-Spun Fibers" ECOC-IOOC 2003, Proceedings, vol. 4, Th. 1.7.4., 2 pages, (2003).

(Continued)

Primary Examiner—Charlie Peng
(74) Attorney, Agent, or Firm—Finnegan, Henderson, Farabow, Garrett & Dunner, L.L.P.

(57) ABSTRACT

An optical fiber link has a plurality of optical fiber spans joined one to the other, the plurality of optical fiber spans including at least one first unidirectionally-spun optical fiber span and at least one second unidirectionally-spun optical fiber span having mutually opposite spinning directions.

25 Claims, 11 Drawing Sheets

U.S. PATENT DOCUMENTS

| | | | |
|---|---|---|---|
| 5,943,466 | A | 8/1999 | Henderson et al. |
| 6,628,869 | B2 * | 9/2003 | Bohnert et al. .............. 385/123 |
| 7,409,126 | B2 * | 8/2008 | Roba et al. .................. 385/100 |
| 2001/0020374 | A1 | 9/2001 | Roba et al. |

FOREIGN PATENT DOCUMENTS

| | | |
|---|---|---|
| GB | 2 101 762 | 1/1983 |
| WO | WO-00/14579 | 3/2000 |
| WO | WO-02/03115 A1 | 1/2002 |
| WO | WO-2004/028989 A1 | 4/2004 |
| WO | WO-2004/095097 A1 | 11/2004 |

OTHER PUBLICATIONS

Galtarossa et al.; "Polarization Mode Dispersion Properties of Constantly Spun Randomly Birefringent Fibers"; Optics Letters, vol. 28, No. 18, pp. 1639-1641, (2003).

Chen et al.; "Scaling Properties of Polarization Mode Dipsersion of Spun Fibers in the Presence of Random Mode Coupling"; Optics Letters, vol. 27, No. 18, pp. 1595-1597, (2002).

Galtarossa et al.; "Optimized Spinning Design for Low PMD Fibers: An Analytical Approach"; Journal of Lightwave Technology, vol. 19, No. 10, pp. 1502-1512, (2001).

Galtarossa et al.; "First- and Second-Order PMD Statistical Properties of Constantly Spun Randomly Birefringent Fibers"; Journal of Lightwave Technology, vol. 22, No. 4, pp. 1127-1136, (2004).

* cited by examiner

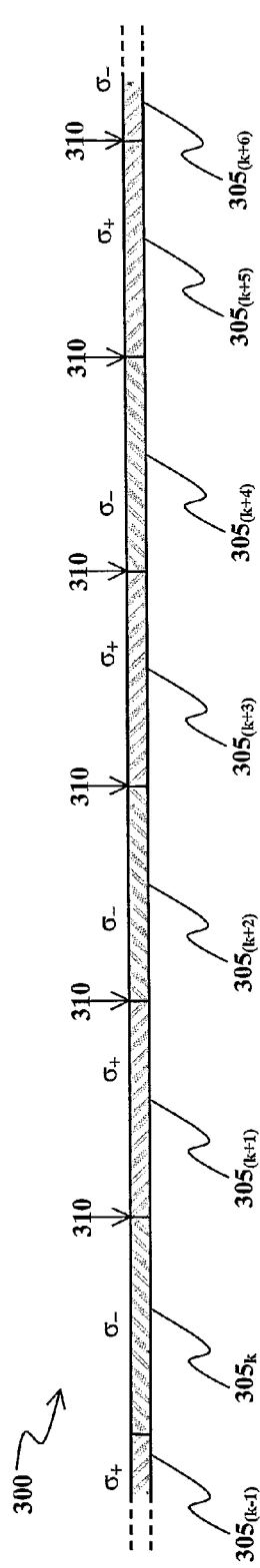
FIG. 2
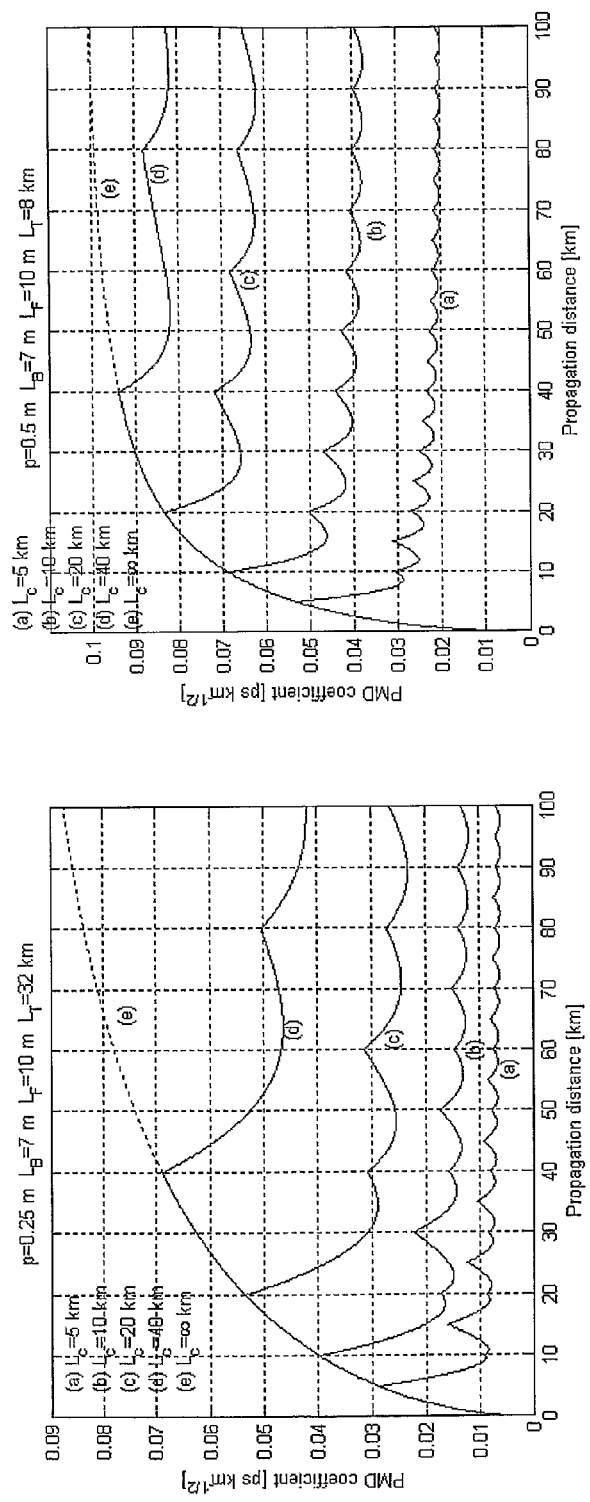
FIG. 3A
FIG. 3B

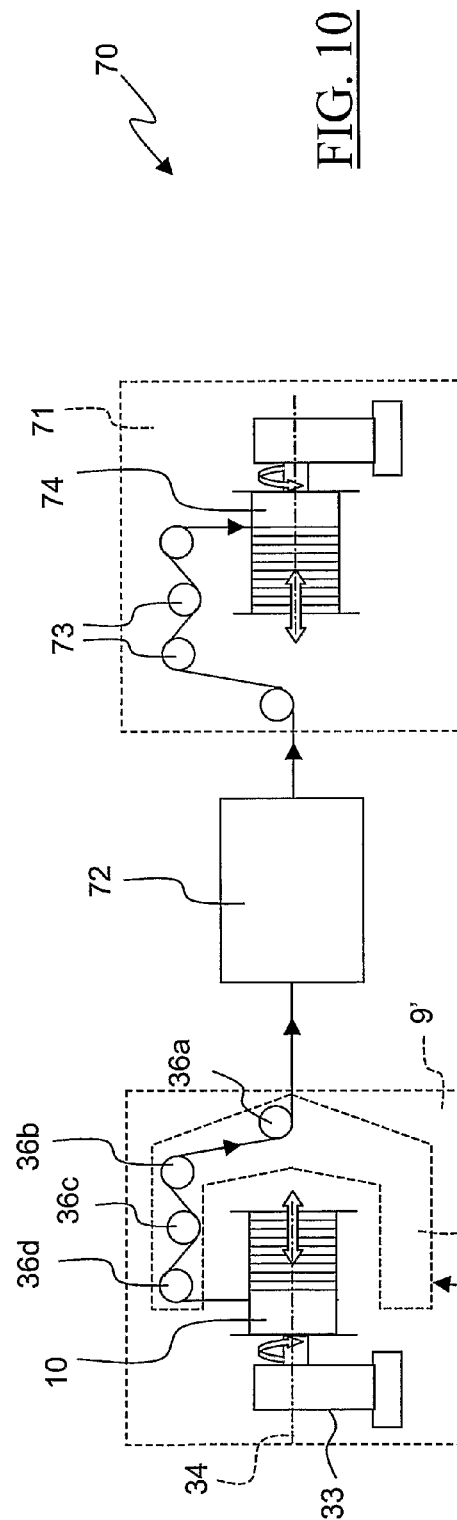

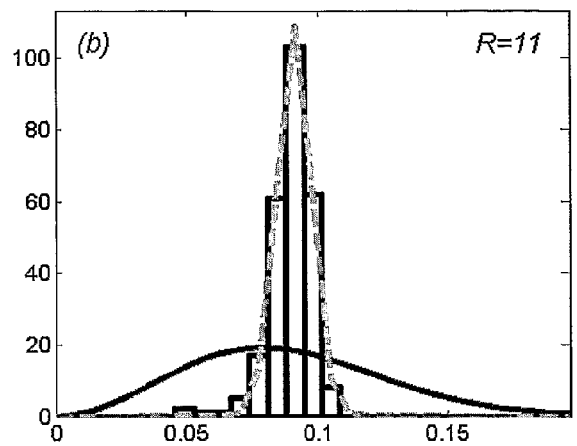
FIG. 13B
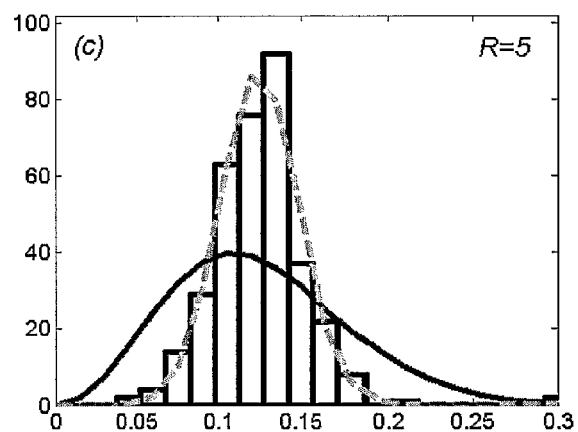
FIG. 13C
FIG. 13D
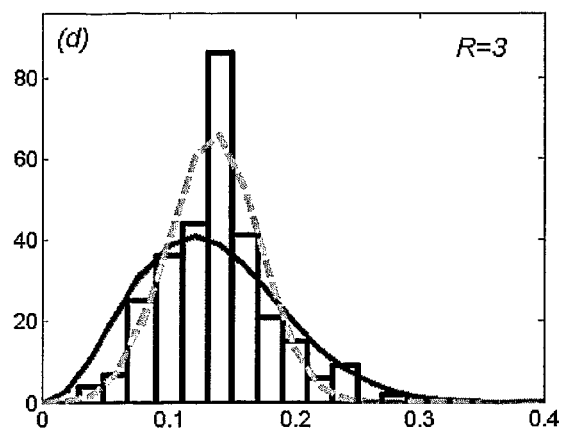

LOW POLARISATION MODE DISPERSION (PMD) OPTICAL FIBER LINK, AND METHOD OF MAKING THE SAME

CROSS REFERENCE TO RELATED APPLICATIONS

This application is a national phase application based on PCT/EP2004/053545, filed Dec. 16, 2004, and claims the priority of PCT/EP03/51118, filed Dec. 30, 2003 and PCT/EP2004/050521, filed Apr. 14, 2004, the content of all of which is incorporated herein by reference.

BACKGROUND OF THE INVENTION

1. Field of the Invention

The present invention generally relates to the field of optical fibers and to manufacturing methods thereof. More particularly, the invention concerns an optical fiber link featuring a low Polarization Mode Dispersion (shortly, PMD), and a method of realizing it.

2. Description of the Related Art

Optical signals transmitted through single-mode optical fibers comprise two orthogonal polarization modes (typically denoted Transverse Electric, or TE, and Transverse Magnetic, or TM). In case the fiber has a perfectly cylindrical core of uniform diameter, the two modes TE and TM propagate at a common velocity. However, in real optical fibers the cylindrical symmetry of the core may be disrupted due to shape defects or non-uniform stresses. As a result, a phase difference can accumulate between the two modes as they propagate, and the fiber is said to exhibit "birefringence". In particular, the birefringence introduced by shape and stress asymmetry is known as "intrinsic linear birefringence".

The structural and geometrical irregularities of the optical fiber that give rise to birefringence typically originate from the fiber preform itself, and are modified during the process of drawing the fiber. This process is usually carried out by means of an apparatus known as a "drawing tower", starting from a glass preform. In practice, after the preform has been placed in vertical position and heated to a temperature above the softening point within a suitable furnace, the molten material is drawn downwards at a controlled velocity in such a way as to produce a threadlike element that forms the optical fiber itself. In this process, asymmetrical stresses are typically applied to the fiber.

In a birefringent fiber, the two components TE and TM of the fundamental optical mode, initially in phase with each other, return to be in phase again only after a certain propagation length, commonly known as the "beat length" ($L_B$). In other words, the beat length is the period of repetition of a certain state of polarization (on the assumption that the fiber maintains a constant birefringence over this length). A further characteristic parameter of a birefringent fiber is the "correlation length" ($L_F$), which is defined as the distance over which the autocorrelation function of the birefringence is 1/e times its maximum value.

In the so-called "polarization-preserving" optical fibers, asymmetry is deliberately introduced into the fiber to generate birefringence. However, in ordinary (i.e., non-polarization-preserving) fibers, birefringence is detrimental to the fiber performance.

In fact, when pulsed signals are transmitted into an optical fiber, birefringence is a cause of pulse spreading, since the two polarization components, TE and TM, travel at different group velocities (i.e. become dispersed). This phenomenon, known as Polarization Mode Dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performances in transmission and reception.

U.K. patent application GB-A-2101762 considers the effects on PMD of post-draw fiber twisting and observes that, although such twisting reduces the PMD resulting from intrinsic linear birefringence, it introduces torsional stresses that generate a substantial circular birefringence due to the photo-elastic effect. Twisting a drawn fiber thus reduces the bandwidth limitation due to one effect, whilst replacing it with another. The same patent application thus proposes to spin the preform during drawing, so that twisting can be effected whilst keeping the fiber material substantially unstressed. Spinning is performed at a relatively high rate, so that its spatial repetition frequency, or spin pitch, is small compared to the beat length due to intrinsic birefringence; as a result, an optical fiber can be produced wherein the contribution of birefringence due to form and stress asymmetries is greatly reduced. Such a fiber is termed "spun" fiber, to distinguish it from a (post-drawn) twisted fiber. Conveniently, the preform is spun at a substantially constant rate, but it could even reverse in direction, oscillating from a right-handed to a left-handed twist.

In the present description, the same distinction as above will be made between "spin" and "twist". More precisely, the terms "spin" and "twist" are herein used to identify two different types of torsion of the fiber: "spin" identifies a torsion that is frozen-in during drawing, being applied to a viscous portion of the fiber and kept as a structural modification of the fiber while cooling; differently, "twist" identifies an elastic torsion of the fiber, which is present when a torque is applied to a portion of fiber whose ends are constrained against rotation. In other words, although both spin and twist alter the fiber in shape, so that parts previously in the same straight line are located in a spiral curve, a twisted fiber will rotate back to its original shape when its ends are released from the rotation constraint, while a spun fiber will keep this alteration as an intrinsic and permanent deformation. Due to spinning, the fiber undergoes a rotation of its polarization axes. As a result, when optical pulses are transmitted into the optical fiber, they propagate alternately on the slow and fast birefringence axes, thus compensating the relative delay and reducing the pulse spreading. This is equivalent to having a local effective refractive index for the optical pulses equal to the mean refractive index on the two axes, the average being taken over the pulse length along the fiber.

Theoretical studies have shown that the dominant process for the reduction of PMD in a spun fiber is the averaging of the local fiber anisotropy by the rapid procession of the axes of asymmetry along the fiber.

The U.S. Pat. No. 4,504,300, relating to a technique for making an optical fiber having chiralic structure, addresses drawbacks related to preform rotation and proposes a new spinning technique, consisting in rotating the fiber instead of the preform. In particular, a device is disclosed comprising means disposed just below the preform for twisting the fiber during fiber drawing. The twisting means comprise a rotating hoop supporting three pulleys. The twisted fiber is coated by coating means, followed by cooling by fast-cooling means that facilitate freezing-in of the twist.

The U.S. Pat. No. 5,418,881 proposes to arrange the device adapted to apply the torque to the fiber downstream of the coating station, so as to avoid damaging the fiber surface. In particular, the torque is applied by alternately canting in clockwise and counterclockwise direction a fiber-guiding roll having a rotation axis which extends perpendicularly to the drawing axis of the fiber. In this way, in at least a portion of the fiber the spin impressed to the fiber is alternately clockwise and counter-clockwise. The same patent states that applying a clockwise and a counterclockwise torque to the fiber substantially prevents introduction of an elastic twist to the fiber.

The United States patent application N. US2001/0020374 proposes a new device that overcomes some drawbacks of the canting-roll technique and allows both unidirectional and alternate spinning, but also states that alternate spinning is to be considered as preferable since it prevents the presence of residual torsions (i.e., of a residual twist) on the fibers wound onto the collecting spool, thus making easier both the unwinding and wiring operations of the same.

In the U.S. Pat. No. 5,943,466, it is proposed to spin the fiber during drawing in accordance with spin functions which are not substantially constant (in the sense that they change substantially as a function of distance along the length of a fiber or as a function of time), not substantially sinusoidal, and have sufficient variability (e.g. sufficient harmonic content) to provide a substantial reduction in PMD for a plurality of beat lengths.

The Applicant has found some other drawbacks of the alternate spinning technique, not previously highlighted. Alternate spinning may for example cause a relatively low mechanical efficiency of the spinning device, due to the continuous accelerations and decelerations. Moreover, with respect to a unidirectional spin, an alternate spin requires a relatively high peak profile amplitude to compensate those positions of the profile where the rotation slows down to change direction and, therefore, to guarantee a sufficient average spin rate. Besides all this, the sites where the spin rate is zero are detrimental for the PMD, because there is an increase of the effective birefringence seen by the pulse, and so a higher contribution for PMD.

The paper by A. Galtarossa et al., "PMD statistical properties of constantly-spun fibers", ECOC-IOOC 2003 Proceedings, Vol. 4, Th. 1.7.4, and the paper by A. Galtarossa et al. "Polarization mode dispersion properties of constantly spun randomly birefringent fibers", Optics Letters, vol 28 No. 18, September 2003, pp. 1639-1641 report the PMD induced delay (i.e. the mode delay—in ps—induced by PMD or, equivalently, the mean fiber Differential Group Delay, or "DGD") of unidirectionally-spun fibers. It can be shown that, while in an unspun fiber or an alternately spun fiber the PMD induced delay increases proportionally to the square root of the fiber length, in a unidirectionally-spun fiber the PMD induced delay has a higher increase rate, and only asymptotically increases proportionally to the square root of length. In particular, the PMD induced delay in a unidirectionally-spun fiber asymptotically increases at the same rate as the PMD induced delay of an unspun fiber having the same beat length $L_B$ and the same correlation length $L_F$. Advantageously, a PMD coefficient, hereinafter indicated with $PMD_c$, defined as the mean fiber DGD divided by the square root of length, is introduced. For unspun or alternately spun fibers, this parameter is independent from the fiber length.

In greater detail, reference is made to FIG. 1, wherein a theoretical diagram of the average of the squared DGD $<\Delta\tau^2>$ (in ordinate, unit $ps^2$) as a function of the propagation distance (in abscissa, unit km) is shown for an unspun fiber (curve (a)) with a typical (constant) $PMD_c$ (e.g., 0.1 ps/$km^{1/2}$), an alternately spun fiber (curve (b)) with a typical (constant) $PMD_c$ (e.g., 0.04 ps/$km^{1/2}$) and a unidirectionally spun fiber (curve (c)) with the same beat length $L_B$ and the same correlation length $L_F$ as the unspun fiber. From the diagram, it can be appreciated that the slope of curve (c) (i.e. the increase rate of $<\Delta\tau^2>$) is not constant, but increases with the propagation distance up to a constant value corresponding to the slope of curve (a). The length over which the slope changes can be denoted as a transient length. Since the $PMD_c$ is proportional to the square root of $<\Delta\tau^2>$ divided by the square root of the fiber length, it is expected that such a coefficient increases with the propagation distance (i.e. with the fiber length), differently from the $PMD_c$ of unspun and alternately spun fibers, which is constant. In particular, for the unidirectionally spun fiber, the increase of the $PMD_c$ will be more rapid in the initial transient, before the increase rate of the PMDc becomes similar to that of the unspun fiber; after the transitory, the $PMD_c$ increases very slowly reaching asymptotically the $PMD_c$ of the unspun fiber. As already predicted in the article by Galtarossa et al., "Optimized Spinning Design for Low PMD Fibers: An Analytical Approach" Journal of Lightwave technology vol. 19 no. 10 October 2001 pp. 1502-1512, the initial $PMD_c$ increase is the one predicted in the deterministic regime.

In the above-cited articles by Galtarossa, it is also described that the magnitude of the spin period changes the length of the above-mentioned transient regime, and that a transient characteristic length $L_T$ can be defined for unidirectionally spun fibers (curve (c) in FIG. 1):

$$L_T = L_F\left(1 + \frac{4L_B^2}{p^2}\right)$$

where p is the spinning period, $L_F$ the correlation length and $L_B$ the beat length. The transient characteristic length $L_T$ is equal to the intercept of the linear asymptotic behavior of curve (c) with the abscissa axis. The propagation distance (or length of fiber span) required to approach the regime PMD behavior of the unspun fiber is estimated to be of some transient characteristic lengths.

Assuming that the parameters appearing in the above formula fall within the typical ranges: $L_F=1\div20$ m, $L_B=5\div15$ m, and $p=0.1\div1$ m, the transient characteristic length $L_T$ may vary between 0.1 and 1,800 km, covering four orders of magnitude. If the transient characteristic length $L_T$ is much greater than the link length, the $PMD_c$ increase remains moderate. On the contrary, when the transient characteristic length $L_T$ is comparable to or smaller than the link length, the $PMD_c$ increase over the link becomes significant and can be detrimental to signal transmission.

Thus, unidirectionally spun fibers with short transient characteristic lengths suffer from a growth of the PMDc with the fiber length, which cancel the advantage of using a spun fiber.

Another prediction made in the cited paper by A. Galtarossa published in Optics Letter is that the DGD statistical distribution for short enough unidirectionally spun fibers may deviate from the typical Maxwell distribution exhibited by both unspun and alternately spun fibers.

SUMMARY OF THE INVENTION

In view of the state of the art outlined in the foregoing, it appears that an optimum solution to the problem of PMD in fibers does not exist: unspun fibers have in fact a PMD which, for several applications, is too high; on the other hand, alternately spun fibers exhibit the series of problems previously mentioned. From the above theoretical considerations it also comes out that unidirectionally spun fiber may be preferable with respect to unspun fibers only for relatively short fiber lengths, because they experience a growth of their $PMD_c$ as the length increases, which becomes asymptotically equal to the one of unspun fibers.

Thus, it has been an object of the present invention to devise a solution to these problems.

In particular, it has been an object of the present invention to provide an optical fiber link, and a method of realizing it, featuring a significant limitation of the $PMD_c$ increase with fiber length.

With these objects in mind, the Applicant has found that the increase in the $PMD_c$ exhibited by unidirectionally spun fibers can be completely eliminated or substantially reduced if an optical fiber link is made of unidirectionally spun fiber spans, of appropriate lengths, with opposite helicity, spliced one to the other to form the optical fiber. With "helicity", it is here intended the fiber spin direction, which can be either right-handed or left-handed (i.e. clockwise or counter clockwise).

Therefore, an optical fiber link according to the present invention includes at least a first and a second optical fiber spans unidirectionally-spun in opposite directions and joined to each other. Preferably, the optical fiber link comprises a first type of fibers unidirectionally-spun in a first direction, and a second type of fibers unidirectionally-spun in the opposite direction, the fibers of the first type being alternated to the fibers of the second type, i.e. fiber spans of opposite helicity are alternated to each other.

According to an aspect of the present invention, an optical fiber link is provided for, as set forth in appended independent optical fiber link claim 1.

In brief, the optical fiber link comprises a plurality of optical fiber spans, joined one to the other, said plurality of optical fiber spans including at least one first unidirectionally-spun optical fiber span and at least one second unidirectionally-spun optical fiber span having mutually opposite spinning directions.

For the purposes of the present invention, the terms "spin", "spinning" and "spun" all relate to a torsion that is frozen-in during drawing, being applied to a viscous portion of the fiber and kept as a structural modification of the fiber while cooling. In other words, a spun fiber will keep this alteration as an intrinsic and permanent deformation.

Also, for the purposes of the present invention, with "unidirectional spin" it is intended a spin that occurs on a same direction apart from possible local inversions, for example due to fiber slippage in the spinning device or in the traction device.

Preferably, the unidirectional spin here considered is constant, but it may also derive from the superposition of a constant spin function and a variable spin function, the variable spin function having preferably small amplitude and long period.

Preferably, the first unidirectionally-spun optical fiber span and the second unidirectionally-spun optical fiber span are joined to each other.

In a preferred embodiment of the present invention, the plurality of optical fiber spans includes a plurality of first optical fiber spans, and a plurality of second optical fiber spans, the first optical fiber spans and the second optical fiber spans being spans of unidirectionally spun optical fibers having mutually opposite spinning directions. The first optical fiber spans and the second optical fiber spans are alternated to each other in the optical fiber link.

The first unidirectionally-spun optical fiber span and the second unidirectionally-spun optical fiber span may have substantially a same span length.

Defined a spinning period p, a correlation length $L_F$ and a beat length $L_B$ for the fiber, the length of the first unidirectionally-spun optical fiber span and/or of the second unidirectionally-spun optical fiber span is preferably lower than 10 times the transient characteristic length $L_T$ defined as $$L_T = L_F \left( 1 + \frac{4L_B^2}{p^2} \right).$$

More preferably, said span length is lower than 5 times the transient characteristic length $L_T$.

In an embodiment of the present invention, said span length is equal to or lower than approximately 3 Km, preferably equal to or lower than approximately 1 Km.

In particular, the first unidirectionally-spun optical fiber span and the second unidirectionally-spun optical fiber span may have substantially a same spin rate.

Preferably, the number of first optical fiber spans and second optical fiber spans is odd.

According to another aspect of the present invention, an optical cable line as set forth in appended claim 10 is provided.

Summarizing, the optical cable line includes a plurality of optical cable trunks joined to each other. Said plurality of optical cable trunks comprises at least a first optical cable trunk and a second optical cable trunk, the first optical cable trunk including a first optical fiber span unidirectionally-spun in a first direction, and the second optical cable trunk including a second optical fiber span unidirectionally-spun in a second direction opposite to the first direction, the first and the second optical fiber spans being optically linked to each other.

In particular, the first and the second optical fiber spans are joined to each other.

The first and the second optical fiber spans may have substantially a same span length.

Preferably, the span length of the first and/or of the second optical fiber span is lower than 10 times the transient characteristic length $L_T$ defined above, more preferably lower than 5 times the transient characteristic length $L_T$. In particular, the fiber span is preferably equal to or lower than approximately 3 Km, more preferably equal to or lower than approximately 1 Km.

In particular, the first and the second optical fiber spans may have substantially a same spin rate.

According to an embodiment of the present invention, the plurality of optical cable trunks include a plurality of first optical fiber spans, and a plurality of second optical fiber spans joined to each other to form an optical fiber link, the first optical fiber spans and the second optical fiber spans being unidirectionally-spun optical fibers having mutually opposite spin directions, and the first optical fiber spans and the second optical fiber spans being alternated to each other in the optical fiber link.

In particular, in an embodiment of the present invention at least one optical cable trunk of said plurality of optical cable trunks has an optical core including a plurality of unidirectionally-spun optical fiber spans having a same spin direction.

In another embodiment of the invention, at least one optical cable trunk of said plurality of optical cable trunks has an optical core including at least two unidirectionally-spun optical fiber spans having opposite spin directions.

Preferably, the total number of optical cable trunks is odd.

According to still another aspect of the present invention, a method of realizing an optical fiber link as set forth in appended independent method claim 21 is provided.

The method comprises:

providing at least a first span of optical fiber, unidirectionally-spun in a first direction;

providing at least a second span of optical fiber, unidirectionally-spun in a second direction opposite to the first direction; and joining the first span and the second span together at a respective end thereof.

According to a further aspect of the present invention, a method of producing an optical cable as set forth in appended claim 22 is provided.

The method comprises providing a plurality of optical fibers to a cable manufacturing line, wherein said plurality of optical fibers comprises at least a first optical fiber being unidirectionally-spun in a first direction, and at least a second optical fiber being unidirectionally-spun in a second direction opposite to the first direction.

According to a still further aspect of the present invention, a method of realizing an optical cable line as set forth in appended claim 23 is provided.

The method comprises forming a plurality of optical cable trunks, each one including at least one optical fiber span, and joining the optical cable trunks one to another.

The step of forming a plurality of optical cable trunks comprises forming at least one first trunk including a first optical fiber span unidirectionally-spun in a first direction, and forming at least one second trunk including a second optical fiber span unidirectionally-spun in a second direction opposite to the first direction; said joining the optical cable trunks one to another includes optically linking the first optical fiber span to said second optical fiber span.

BRIEF DESCRIPTION OF THE DRAWINGS

These and other features and advantages of the present invention will be made apparent by the following detailed description of an embodiment thereof, provided merely by way of non-limitative example, description that will be conducted making reference to the attached drawings, wherein:

FIG. 2 schematically shows a portion of an optical fiber link according to an embodiment of the present invention, comprising alternated, unidirectionally spun fiber spans having mutually opposite helicity;

FIGS. 3A and 3B show diagrams of the predicted variation of the $PMD_c$ (in ordinate, unit ps/km$^{1/2}$) with the propagation distance (in abscissa, unit km) for the fiber of FIG. 2 for various lengths of the alternated fiber spans, and for two different values of the fiber transition characteristic length;

FIG. 10 illustrates a re-spooling apparatus;

FIG. 11 shows a twist apparatus to be used in the drawing tower of FIG. 7, in alternative to the apparatus of FIG. 9; and FIGS. 12 and 13A to 13D are diagrams showing the results of experiments conducted by the Applicant.

DETAILED DESCRIPTION OF THE INVENTION

Figure 1:
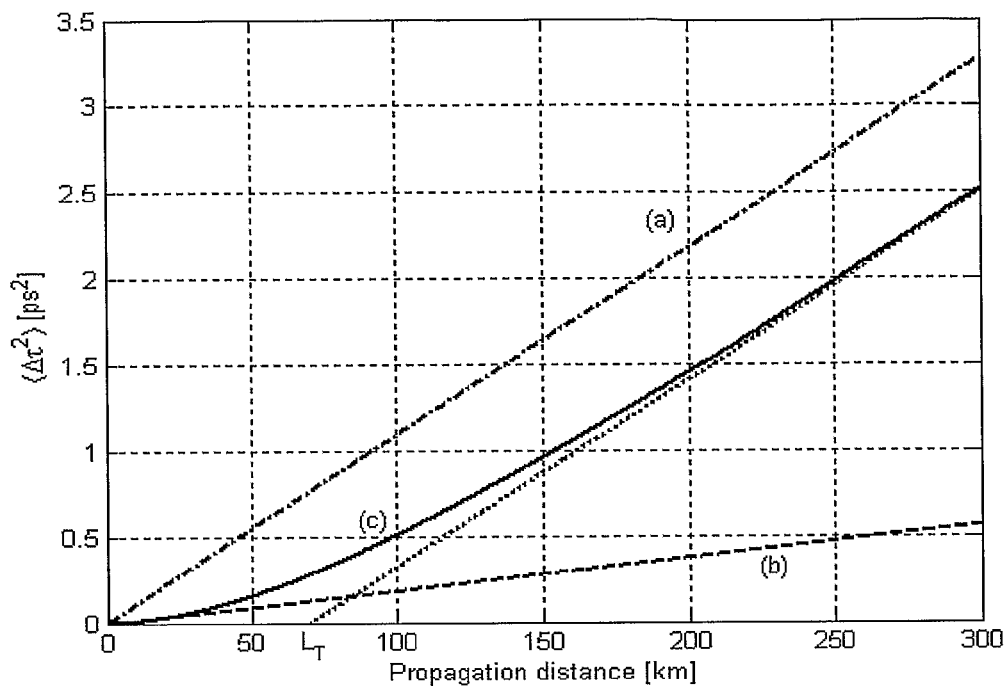
FIG. 1 is a diagram showing the predicted variation of the average of the squared Differential Group Delay (DGD) (in ordinate) with the propagation distance (in abscissa) for: an unspun fiber (curve (a)), an alternately spun fiber (curve (b)) and a unidirectionally spun fiber (curve (c)) with the same beat length $L_B$ and the same correlation length $L_F$ as the unspun fiber.

With reference to the drawings, in FIG. 2 a portion of an optical fiber link according to an embodiment of the present invention is shown very schematically.

By optical fiber link there is intended an optical fiber made up of two or more optical fiber spans, joined to each other.

The optical fiber link, indicated globally as 300, is for example of the type used in optical fiber cables for optical communication systems.

The optical fiber link 300 (the portion of which shown in FIG. 2 being for example an intermediate portion along the overall length of the optical fiber link) comprises a plurality of optical fiber segments or spans . . . , $305_{(k-1)}$, $305_k$, $305_{(k+1)}$, $305_{(k+2)}$, $305_{(k+3)}$, $305_{(k+4)}$, $305_{(k+5)}$, $305_{(k+6)}$, . . . , of shorter length, joined one to another at respective free ends to form the optical fiber link 300; in jargon, the operation of joining of two optical fiber segments together is referred to as "splicing"; in the drawing, the points where two generic optical fiber spans . . . , $305_{(k-1)}$, $305_k$, $305_{(k+1)}$, $305_{(k+2)}$, $305_{(k+3)}$, $305_{(k+4)}$, $305_{(k+5)}$, $305_{(k+6)}$, . . . , are spliced together are schematically indicated by 310.

According to an embodiment of the present invention, the optical fiber spans . . . , $305_{(k-1)}$, $305_k$, $305_{(k+1)}$, $305_{(k+2)}$, $305_{(k+3)}$, $305_{(k+4)}$, $305_{(k+5)}$, $305_{(k+6)}$, . . . , are segments or spans of unidirectionally spun optical fibers. In particular, spans of unidirectionally spun optical fibers with mutually opposite spinning helicity (right-hand, or $\sigma_+$, helicity and left-hand, or $\sigma_-$, helicity) are exploited to form the optical fiber link 300, and the unidirectionally spun fibers spans with right-hand, or $\sigma_+$, spinning helicity are alternated to the unidirectionally spun fibers spans with left-hand, or $\sigma_-$, spinning helicity, as schematically depicted in the drawing. Preferably, the unidirectional spin of the different fiber spans is constant in module.

Due to the fact that splicing together fibers with opposite helicity interrupts the transients of the $PMD_c$ of a unidirectionally-spun fiber towards the unspun fiber value, the growth of the $PMD_c$ of the optical fiber link 300 with the fiber link length, discussed in the introductory part of the present description, may be substantially reduced by the above-described provision in the fiber link 300 of both type of fiber spans.

In principle, the lengths of the individual fiber spans . . . , $305_{(k-1)}$, $305_k$, $305_{(k+1)}$, $305_{(k+2)}$, $305_{(k+3)}$, $305_{(k+4)}$, $305_{(k+5)}$, $305_{(k+6)}, \ldots$, might be whatsoever, but, as will be shown in the following, a careful choice of such lengths allows substantially reducing, or even eliminating, the effect of growth of the $PMD_c$ with the fiber length (thereby, after a certain length, a practically constant $PMD_c$ is achieved, lower than the one of the single-helicity, unidirectionally-spun fiber).

In particular, if the spin rates of the unidirectionally spun optical fibers with $\sigma_+$ helicity have substantially the same magnitude (modulus) as the spin rates of the unidirectionally spun optical fibers with $\sigma_-$ helicity, the best results in terms of suppression of the $PMD_c$ growth with the fiber link length are achieved by alternating, along the fiber link 300, $\sigma_+$ and $\sigma_-$ optical fiber spans of substantially same lengths. However, if the spin rates of the unidirectionally spun optical fibers with $\sigma_+$ helicity have a different magnitude (modulus) from the spin rates of the unidirectionally spun optical fibers with $\sigma_-$ helicity, the lengths of the different $\sigma_+$ and $\sigma_-$ optical fiber spans should depend on the respective spin rate absolute values.

Reference is now made to FIGS. 3A and 3B, which are diagrams of the predicted variation of the $PMD_c$ (in ordinate, unit $ps/km^{1/2}$) with the propagation distance (in abscissa, unit km) for the fiber link 300 for various lengths of the alternated fiber spans . . . , $305_{(k-1)}$, $305_k$, $305_{(k+1)}$, $305_{(k+2)}$, $305_{(k+3)}$ $305_{(k+4)}$, $305_{(k+5)}$, $305_{(k+6)}$, . . . , that make up the fiber link 300, and for two different values of the fiber transient characteristic length $L_T$. The curves have been derived in accordance with the teaching of Galtarossa et al., "Polarization mode dispersion properties of constantly spun randomly birefringent fibers", Optics Letters, vol 28 No. 18, September 2003, pp. 1639-1641, relative to fibers with a single spin direction.

In particular, the diagram of FIG. 3A relates to an optical fiber link 300 made up of alternated unidirectionally spun fiber spans of opposite helicity having a spinning period p=0.25 m, a beat length $L_B$=7 m, a correlation length $L_F$=10 m, and consequently a transient characteristic length $L_T$=32 km. The diagram of FIG. 3B relates instead to a similar optical fiber link 300, but having a spinning period p=0.5 m, and thus featuring a transient characteristic length $L_T$=8 km. In both cases, the evolution of the $PMD_c$ with the propagation distance for alternated fiber spans . . . , $305_{(k-1)}$, $305_k$, $305_{(k+1)}$, $305_{(k+2)}$, $305_{(k+3)}$ $305_{(k+4)}$, $305_{(k+5)}$, $305_{(k+6)}$, . . . , of length $L_C$ equal to 5 km, 10 km, 20 km, 40 km and for an infinite span length (i.e. for a single helicity fiber) is shown.

It can be appreciated that, in both cases, when alternating optical fiber spans unidirectionally-spun with opposite helicity, the $PMD_c$ after a transient attains a substantially constant value which is lower than that of the single-helicity unidirectionally spun fiber, and hence of the unspun fiber with the same beat length $L_B$ and correlation length $L_F$. So, the typical behavior of the single-helicity, unidirectionally-spun fiber is substantially transformed in a behavior similar to that of an alternately spun fiber.

Comparing the two diagrams, it can also be appreciated that the smaller the value of the transient characteristic length $L_T$, the smaller the span length $L_C$ necessary to achieve a same value of the $PMD_c$. It can be appreciated by those skilled in the art that an optimum $L_C$ value can always be evaluated from the link length, the maximum allowed number of spans, and the transient characteristic length.

From the two diagrams of FIGS. 3A and 3B it can also be noted that, for a value of the beat length $L_B$=7 m and a value of the fiber correlation length $L_F$=10 m, a span length $L_C$ substantially equal to the transient characteristic length $L_T$ gives a $PMD_c$ of about 0.04 $ps/km^{1/2}$, that is a value comparable to the one of the commercially available, alternately spun optical fibers.

The optical fiber spans . . . , $305_{(k-1)}$, $305_k$, $305_{(k+1)}$, $305_{(k+2)}$, $305_{(k+3)}$ $305_{(k+4)}$, $305_{(k+5)}$, $305_{(k+6)}$, . . . , are typically cabled and the optical fiber link 300 previously described is therefore typically part of an optical cable line. As schematically shown in FIG. 4B (the drawing is not in scale), an optical cable line 80 typically comprises a plurality of trunks of optical cable . . . , $805_{(k-1)}$, $805_k$, $805_{(k+1)}$, $805_{(k+2)}$, $805_{(k+3)}$, $805_{(k+4)}$, . . . , joined in series (i.e. concatenated) one to the other. Each cable trunk . . . , $805_{(k-1)}$, $805_k$, $805_{(k+1)}$, $805_{(k+2)}$, $805_{(k+3)}$, $805_{(k+4)}$, . . . , includes a respective optical fiber span . . . , $305_{(k-1)}$, $305_k$, $305_{(k+1)}$, $305_{(k+2)}$, $305_{(k+3)}$ $305_{(k+4)}$, $305_{(k+5)}$, $305_{(k+6)}$, . . . .

Each optical cable trunk . . . , $805_{(k-1)}$, $805_k$, $805_{(k+1)}$, $805_{(k+2)}$, $805_{(k+3)}$, $805_{(k+4)}$, . . . , has a typical length in the range from approximately 2 km to approximately 10 km.

Figure 4A:
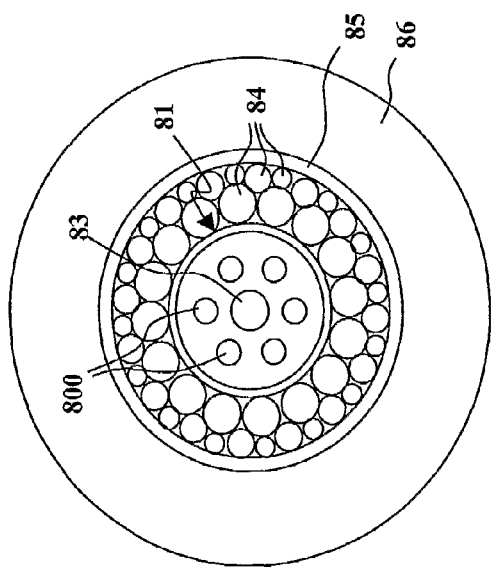
FIG. 4A shows in transverse section an optical cable containing optical fibers in accordance to an embodiment of the present invention.
Figure 4B:
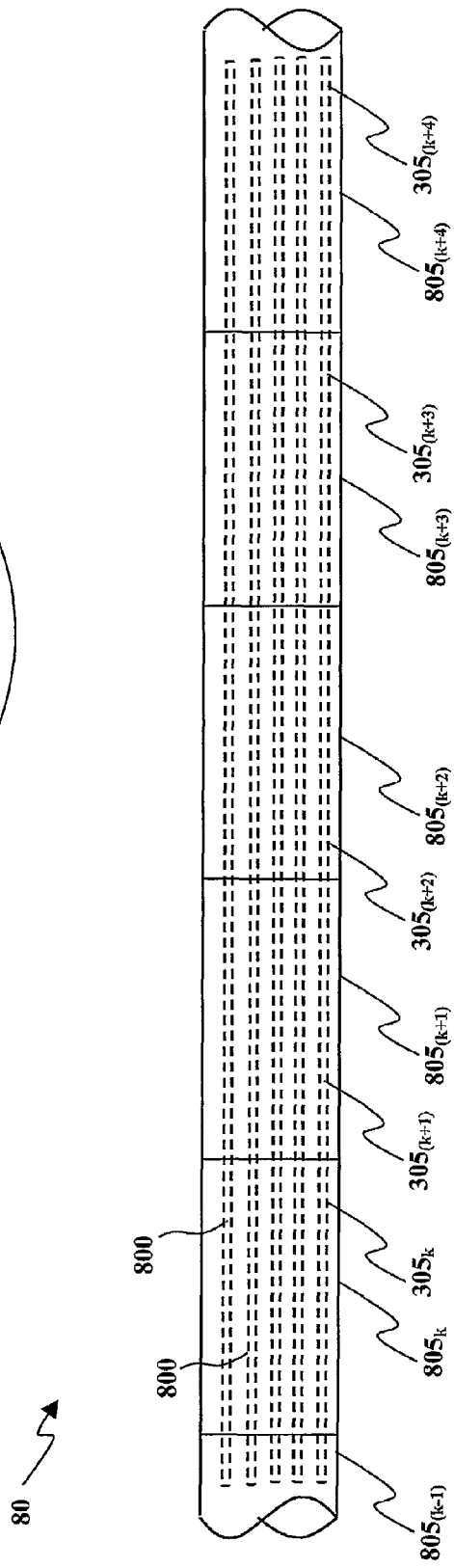
FIG. 4B schematically shows in lateral view a portion of an optical cable line in accordance with the present invention.

With reference to FIG. 4A, a cross-sectional view of an optical cable along the optical cable line 80 is shown; the optical cable typically comprises an optical core 81 containing a plurality of optical fibers 800.

The optical core 81 may be of the "tight" type (as the one illustrated in the drawing), wherein the optical fibers 800 are embedded into a polymeric matrix disposed around a strength member 83, or of the "loose" type, wherein the fibers 800 are loosely housed within a single buffer tube centrally disposed within said cable, or within a plurality of buffer tubes stranded around a central strength member. Around the optical core 81, the optical cable 80 is provided with reinforcing elements 84 and protective sheaths 85, 86.

In "tight" type cabling, the contact between the fiber and the polymeric matrix prevents the twist imparted to the fibers to be released. In "loose" type cabling, the twist imparted on the fiber is not released, for typical cable lengths, due to friction between the fiber and the buffer tube, possibly enhanced by the presence of a jelly filler.

From a manufacturing viewpoint, the optical fiber link 300 can be obtained starting by producing two sets of unidirectionally spun optical fibers having opposite spinning helicity. The two sets of fibers are properly labeled, for example $\sigma_+$ and $\sigma_-$, so as to be able to distinguish fibers of one set from those of the other. Accordingly, the first set will be said to have a $\sigma_+$ helicity and the second set a $\sigma_-$ helicity.

Preferably, in order to easy the task of alternating fiber spans with mutually opposite spinning helicity, the unidirectionally spun optical fiber with $\sigma_+$ helicity has substantially the same spin rate as the unidirectionally spun optical fiber with $\sigma_-$ helicity.

Later on in the present description, an apparatus suitable to produce unidirectionally spun optical fibers will be described in detail, being intended that the way, and the apparatuses, by means of which the unidirectionally spun optical fibers are obtained are not limitative to the present invention.

Once two sets of fibers ($\sigma_+$ and $\sigma_-$) with opposite helicity have been produced, spans of predetermined length of these fibers are used in a cabling process of a known type to produce an optical cable such as the one illustrated in FIG. 4A.

A plurality of optical cable trunks is thus formed. These optical cable trunks are then connected one to another by known techniques, to form an optical cable transmission line such as the one illustrated in FIG. 4B.

According to a first embodiment, each optical cable trunk may include, in its optical core, a certain number (for example, half of the total number) of fibers with a clockwise helicity and a certain number (for example, of half the total number) of fibers with a counter clockwise helicity. In this case, the optical cable trunks may be identical to each other.

According to a second embodiment, each optical cable trunks may include fibers of a single type, i.e. either of clockwise helicity or of counter-clockwise helicity. In this case, cable trunks including only $\sigma_+$ fibers and cable trunks including only $\sigma_-$ fibers are produced.

Then the optical cable trunks are concatenated to each other to form the optical cable line 80. To join together two optical cable trunks, a connecting device of a known type can be used, such as the optical fiber connecting assembly described in the U.S. Pat. No. 5,778,131 or the compact joint Oasys® realized by Pirelli. In practice, the fibers exiting the ends of the two cable trunks are housed and routed in the connecting device, and then they may be spliced end-to-end by a fusion splicer of a know type, such as model FSM-40S/40S-B by Fujikura.

The optical fiber spans . . . , $305_{(k-1)}$, $305_{(k+1)}$, $305_{(k+3)}$, $305_{(k+5)}$, . . . , are so spliced to form the optical fiber link 300. In particular, the optical fiber link 300 is formed by splicing alternately a fiber span . . . , $305_{(k-1)}$, $305_{(k+1)}$, $305_{(k+3)}$, $305_{(k+5)}$, . . . , from the right-handed (left-handed) spun fiber set $\sigma_+$ ($\sigma_-$), with a fiber span . . . , $305_k$, $305_{(k+2)}$, $305_{(k+4)}$, $305_{(k+6)}$, . . . , from the left-handed (right-handed) spun fiber set $\sigma_-$ ($\sigma_+$).

By properly choosing the spin rate of the $\sigma_+$ and $\sigma_-$ optical fiber spans, in particular by making the transient characteristic length $L_T$ suitably longer than the typical cable trunk length, the optical cable line obtained by joining optical cable trunks including optical fibers spans of opposite ($\sigma_+$ and $\sigma_-$) helicity has a low and substantially constant PMD$_c$.

If the optical cable trunks include optical fiber spans of a same helicity (either right-handed, i.e. $\sigma_+$, or left-handed, i.e. $\sigma_-$), the optical cable 80 is preferably made by alternating cable trunks including $\sigma_+$ fiber spans with cable trunks including $\sigma_-$ optical fiber spans.

Alternatively, if the optical cable trunks include both $\sigma_+$ and $\sigma_-$ optical fiber spans, the optical cable is preferably made by joining the different cable trunks in such a way that $\sigma_+$ fibers spans are spliced with $\sigma_-$ fiber spans.

The Applicant has investigated the PMD statistical properties of an optical fiber link such as the link 300.

It is known in the art that both unspun and alternately spun optical fibers present a Maxwellian statistical distribution of the DGD values. The Maxwellian distribution is characterized by a ratio between the average of the squared DGD, $<\Delta\tau^2>$, and the square of the averaged DGD, $<\Delta\tau>^2$, equal to:

$$r = \frac{\langle \Delta\tau^2 \rangle}{\langle \Delta\tau \rangle^2} = \frac{3\pi}{8} \approx 1.18$$

Figure 5:
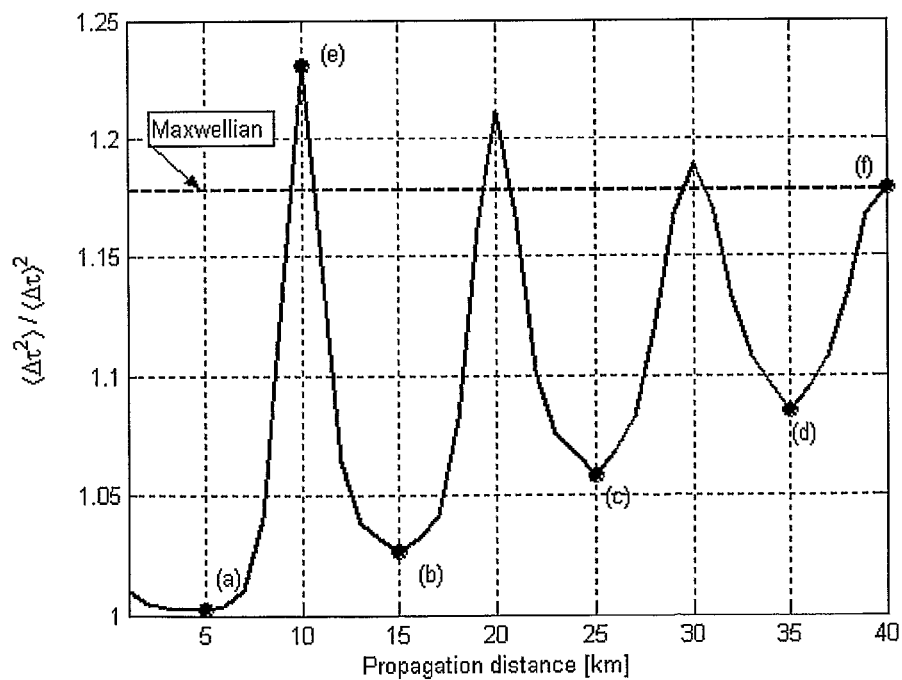
FIG. 5 is a diagram showing the predicted variation with the propagation length (in abscissa, unit km) of the ratio between the average of the squared DGD values to the square of the averaged DGD values (in ordinate) for a fiber with the same parameters of FIG. 3A, with alternated spans length of 5 km.

In FIG. 5 the numerically computed (predicted) ratio r is plotted as a function of the propagating length. The optical fiber link parameters are the same as for the fiber of the diagram of FIG. 3A, with a span length $L_C$=5 km. The ratio r exhibits strong oscillations superimposed to a monotonous rise towards the asymptotic value, equal to 1.18. A value of r larger than 1.18 indicates a statistical dispersion of the DGD values distribution larger than that typical of the Maxwellian distribution. On the other side, a value of r smaller than 1.18 indicates that the DGD values are less dispersed than in the Maxwell case.

FIGS. 6A to 6F are diagrams showing the statistical distribution of the DGD values at points (a) to (f) of FIG. 5, respectively.

Figure 6A:
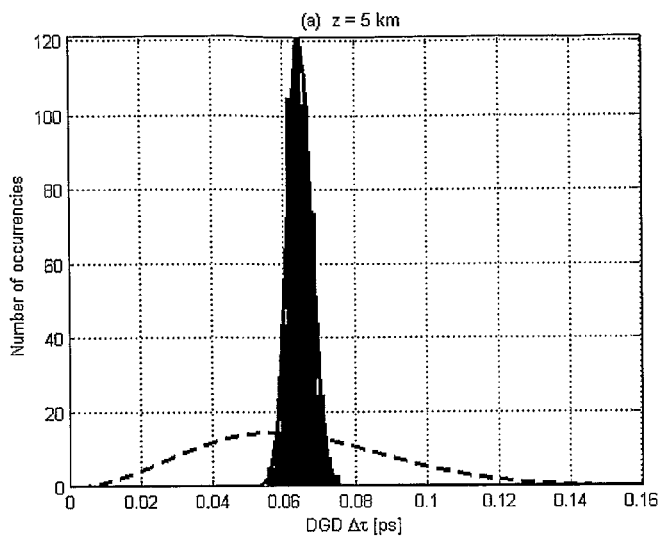
FIGS. 6A to 6F are diagrams showing the statistical distribution of the DGD values for the same fiber of FIG. 5 at propagation distances indicated in FIG. 5 with the letters a) to f) respectively.
Figure 6B:
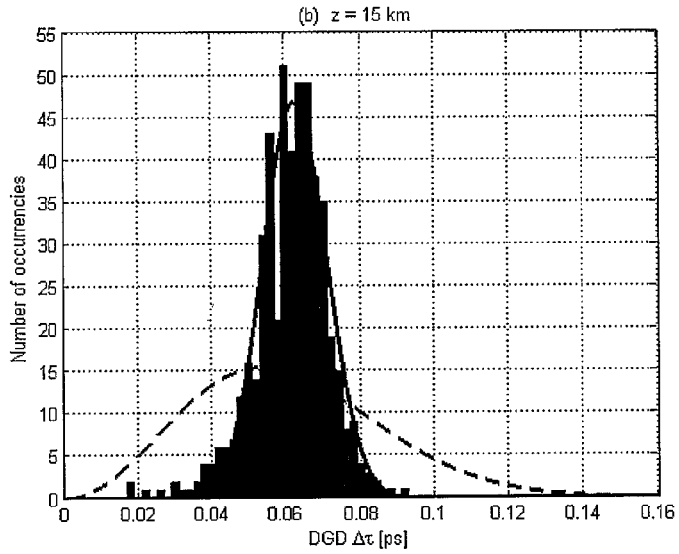
Figure 6C:
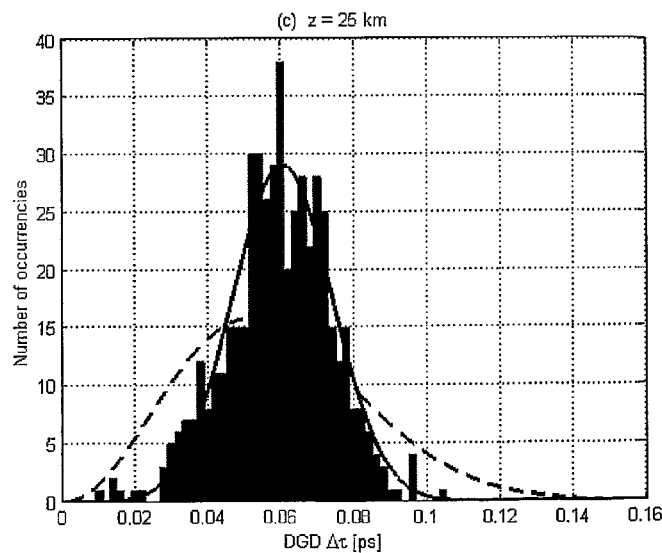
Figure 6D:
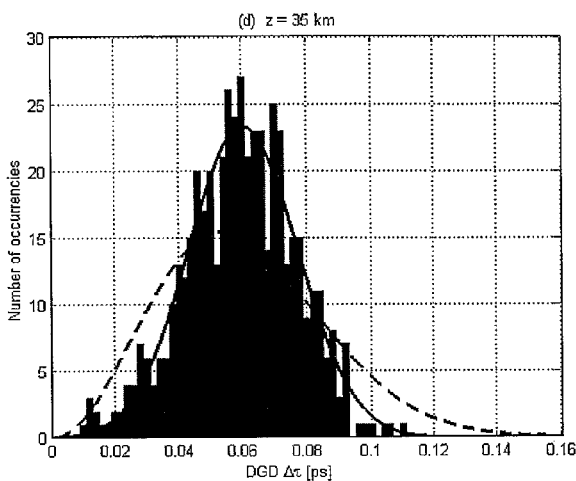
Figure 6E:
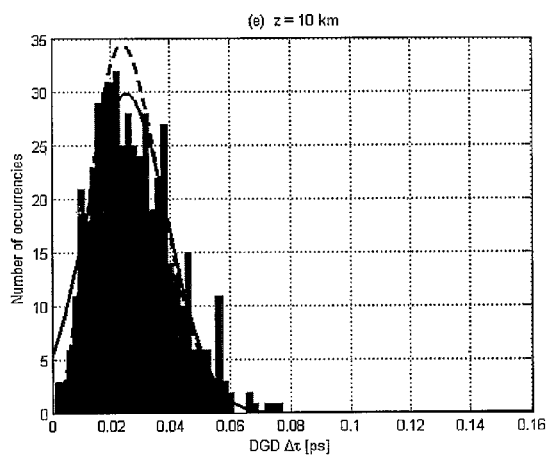
Figure 6F:
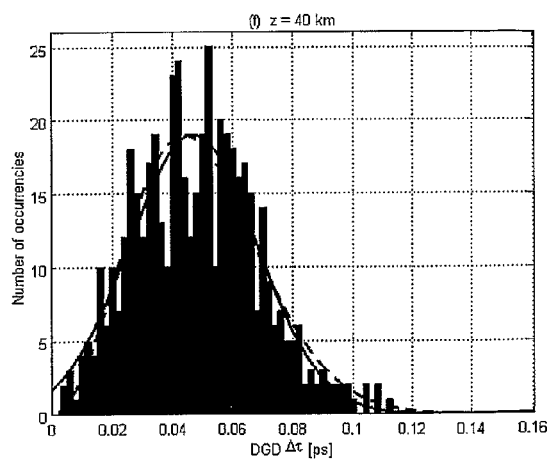

According to these results, an odd number of fiber spans joined together guarantees a Gaussian-like DGD statistical distribution narrower than the Maxwellian one, as shown in FIGS. 6A-6D, and correspondingly in the points marked (a)-(d) in FIG. 5. Here and in the following Figures, the dashed lines indicate the Maxwellian fit, and the solid lines the Gaussian fit. However, the narrowing of the distribution below the Maxwellian limit diminishes as the span number increases. On the other side, an even span number gives a DGD dispersion larger than, and asymptotically equal to, the Maxwellian distribution, as shown in FIGS. 6E and 6F, and correspondently in the points marked as (e) and (f) in FIG. 5.

The prediction of the DGD statistical distribution deviation mentioned in the introductory part of the present description is based on the following considerations. The statistical properties of the DGD are determined by the three stochastic Gauss-distributed components of the polarization dispersion vector $\Omega i$, with i=1, 2, 3, according to the formula (reported in a paper by A. Galtarossa et al., Optics Letters, Vol. 28, No. 18, September 2003):

$$DGD = \sqrt{\Omega_1^2 + \Omega_2^2 + \Omega_3^2}.$$

The PMD$_c$ is the expectation value of the DGD statistical distribution, divided by the square root of the fiber length L.

In unidirectionally spun fibers, $\Omega_3^2$ behaves markedly differently from $\Omega_1^2$ and $\Omega_2^2$. For small z the DGD is mainly determined by the component $\Omega_3^2$, so that it tends to obey a Gauss-like distribution. As z increases, $\Omega_1^2$ and $\Omega_2^2$ catch-up, the three components tend to acquire the same statistical weight and the DGD becomes Maxwell-distributed.

In unidirectional fibers, the PMDc increase with z follows from the (asymptotically linear) increase with z of the averages $<\Omega_i^2(z)>$, i=1, 2, 3. The Applicant has found that, by alternating spans of opposite helicity, these averages can be substantially reduced with respect to the single-helicity case, and that the shorter the span length, the stronger the reduction.

In the following, an apparatus and a method to produce unidirectionally spun optical fibers will be described in detail. It is understood that these apparatus and method are not limitative to the present invention, any other method, and apparatus, adapted to produce unidirectionally spun fibers being suitable.

Figure 7:
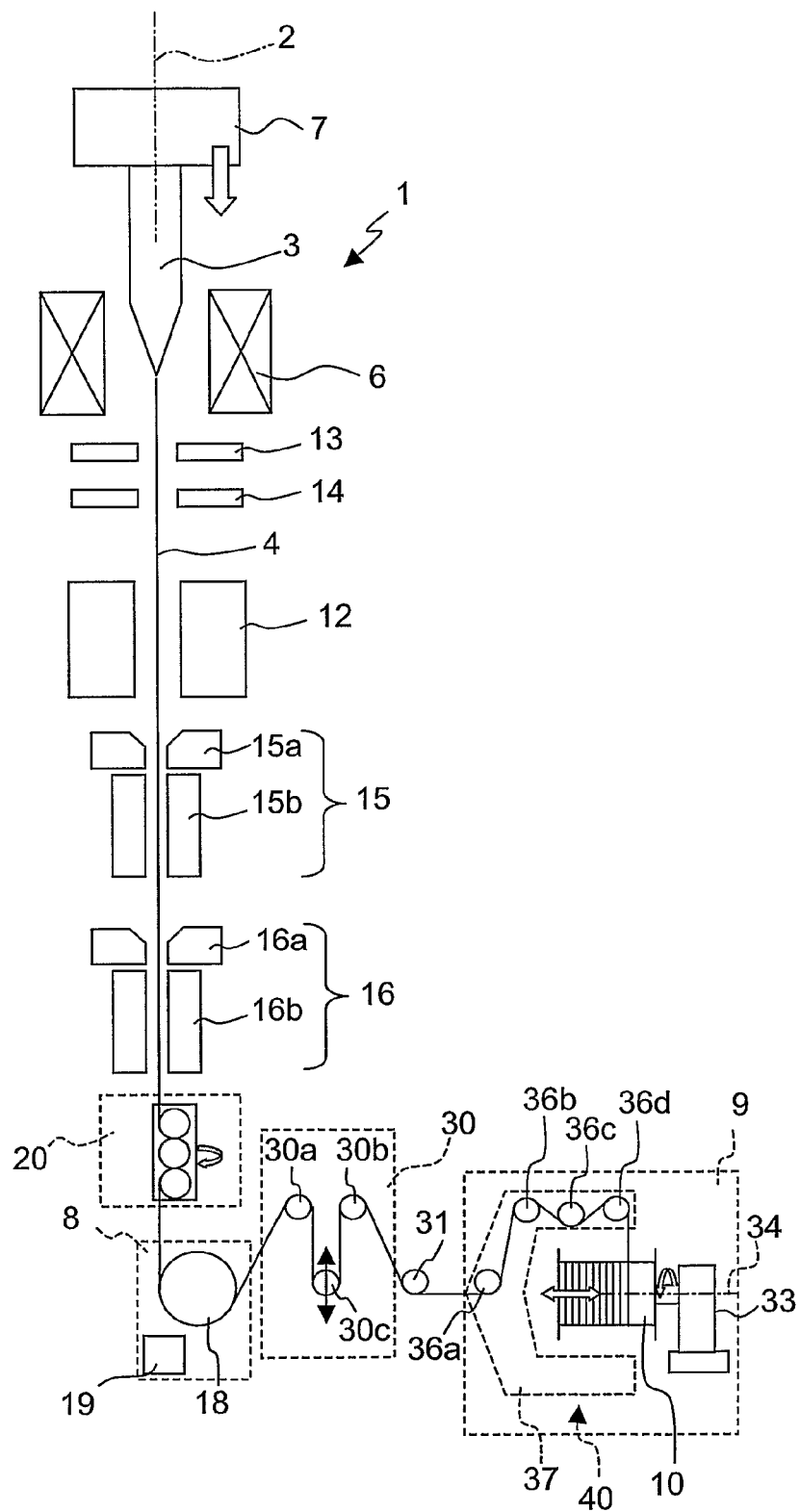
FIG. 7 shows a drawing tower adapted to drawing unidirectionally spun fibers.

With reference to FIG. 7, a drawing tower 1 comprises a plurality of devices that are substantially aligned along a vertical drawing axis 2 (whence the term "tower"). The choice of a vertical direction in order to perform the main steps of the drawing process arises from the need to exploit the gravitational force so as to obtain, from a glass preform 3, molten material from which an optical fiber 4 can be drawn.

In detail, the tower 1 comprises a furnace 6 for performing a controlled melting of a lower portion of the preform 3 (also known as preform neckdown), a feeding device 7 for supporting the preform 3 and feeding it into the furnace 6 from the above, a traction device 8 (at a lower end of the tower) for pulling the fiber 4 from the preform 3, and a winding device 9 for storing the fiber 4 onto a reel 10.

The furnace 6 may be of any type designed to produce a controlled melting of a preform. Examples of furnaces that can be used in the tower 1 are described in U.S. Pat. Nos. 4,969,941 and 5,114,338.

Preferably, a cooling device 12, for example of a type having a cooling cavity designed to be passed through by a flow of cooling gas, is situated underneath the furnace 6 for cooling the fiber 4 leaving it. The cooling device 12 is arranged coaxially to the axis 2, so that the fiber 4 leaving the furnace 6 can pass through it.

The tower 1 may also be provided with a tension-monitoring device 13 (for example of the type described in the U.S. Pat. No. 5,316,562), and a diameter sensor 14 of a known type, preferably positioned between the furnace 6 and the cooling device 12, for measuring the tension and the diameter of the fiber 4, respectively.

Preferably, the tower 1 further comprises a first and a second coating devices 15, 16 of a known type, positioned underneath the cooling device 12 in the vertical drawing direction and designed to deposit onto the fiber 4, as it passes through, a first protective coating and, respectively, a second protective coating. Each coating device 15, 16 comprises, in particular, a respective application unit 15a, 16a which is designed to apply onto fiber 4 a predefined quantity of resin, and a respective curing unit 15b, 16b, for example a UV-lamp oven, for curing the resin, thus providing a stable coating.

The traction device 8 may be of the single pulley or double pulley type. In the illustrated embodiment, the traction device 8 comprises a single motor-driven pulley (or "capstan") 18 that is designed to draw the fiber 4, already coated, in the vertical drawing direction. The traction device 8 may be provided with an angular velocity sensor 19 that is designed to generate a signal indicating the angular velocity of the pulley 18 during its operation. The rotation speed of the pulley 18 and, therefore, the drawing speed of the fiber 4, may be varied during the process, for example as a response to a diameter variation detected by detector 14.

The tower 1 further comprises a spinning device 20, positioned between the coating devices 15, 16 and the traction device 8, for imparting a spin to the fiber 4 about its axis during drawing. For the purposes of the present description, the term "spin" denotes the ratio (disregarding a constant multiplication factor) between the angular velocity of rotation $dq/dt$ of the optical fiber (where q is the angle of rotation of the optical fiber measured with respect to a fixed reference point) and the velocity of drawing. The spin defined in this way is typically measured in turns/m.

Figure 8:
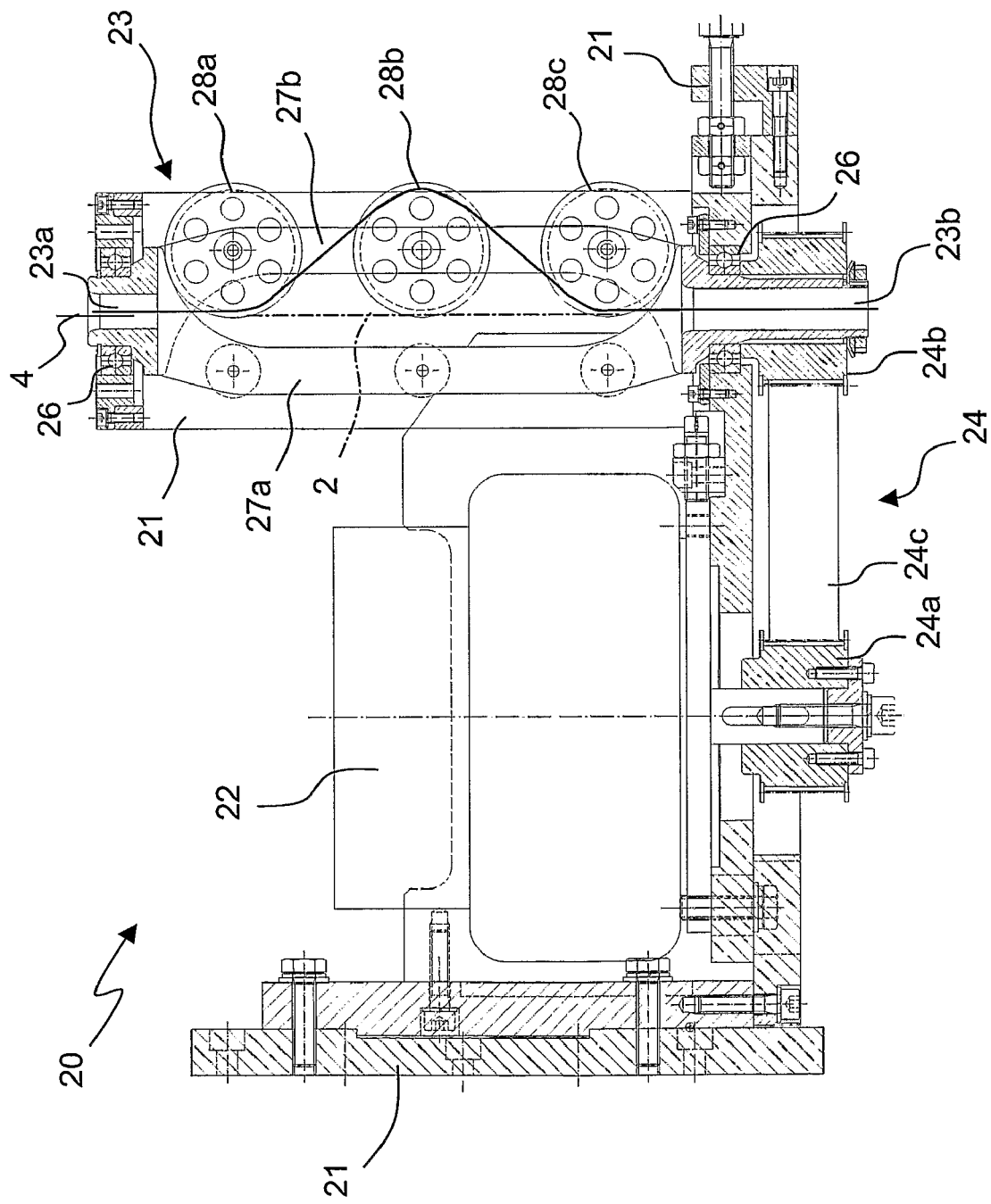
FIG. 8 illustrates a spinning device suitable to be used in the drawing tower of FIG. 7.

In one possible embodiment, illustrated in FIG. 8, the spinning device 20 comprises a fixed support frame 21, a DC motor 22 held by the frame 21 and a rotating member 23 held by the frame 21 and coupled to the motor 22 through a belt transmission 24. The belt transmission comprises a first driving pulley 24a rigidly coupled to the motor 22, a second driving pulley 24b rigidly coupled to the rotating member 23 and a belt 24c connecting the first driving pulley 24a to the second driving pulley 24b.

The rotating member 23 has a rotation axis corresponding to the axis 2, i.e. to the axis of motion of the fiber 4 when entering and leaving the device 20. The rotating member 23 comprises a first and a second sleeve-like end portion 23a, 23b (respectively upper and lower), which are rotatably coupled to the support frame 21 by means of respective bearings 26 and which allows passage of the fiber there through. The second end portion 23b is coupled with the second driving pulley 24b.

The rotating member 23 comprises two arms 27a, 27b, extending from the first end portion 23a to the second end portion 23b. The arms 27a, 27b are substantially C-shaped, with a main straight central region parallel to the axis 2, and are arranged symmetrically to each other with respect to the axis 2. One of the two arms (the one indicated with 27b in the drawing) carries a first, a second, and a third idle-mounted rotating pulley 28a, 28b, 28c (from up to down in the drawing), substantially aligned in a direction parallel to the axis 2. The three pulleys 28a, 28b, 28c have the corresponding axes perpendicular to the axis 2 and are dimensioned so that the corresponding guiding grooves are substantially tangent to the axis 2.

Referring back to FIG. 7, the tower 1 may also comprise a tension-control device 30, commonly known as "dancer", for adjusting the tension of the fiber 4 downstream the traction device 8. The tension-control device 30 is designed to counterbalance any variations in tension of the fiber 4 between the pulley 18 and the winding device 9. The tension-control device 30 may comprise, for example, a first and a second pulleys 30a, 30b that are mounted idle and in a fixed position, and a third pulley 30c which is free to move vertically, under the action of its own weight and the tension of the fiber 4. In practice, the pulley 30c is raised if there is an undesirable increase in the tension of the fiber 4 and is lowered if there is an undesirable decrease in the tension of the fiber 4, so as to keep the said tension substantially constant. The pulley 30c may be provided with a vertical position sensor (not shown) that is designed to generate a signal indicating the vertical position of the pulley 30c and therefore indicating the tension of the fiber 4.

One or more pulleys 31 (or guiding members of other types) are advantageously provided for guiding the fiber 4 from the tension-control device 30 to the winding device 9.

The winding device 9 comprises, in the illustrated embodiment, a first, a second, a third and a fourth guiding pulleys 36a, 36b, 36c, 36d, held by a support member 37, for guiding the fiber 4 onto the reel 10. The winding device 9 further comprises a motorized device 33 for setting the reel 10 into rotation about its axis 34. The motorized device 33 may also be suitable for reciprocating the reel 10 along the axis 34, so as to allow helix winding of the fiber 4 thereon during drawing. Alternatively, the reel 10 may be axially fixed and the support member 37 (together with the pulleys 36a, 36b, 36c, 36d) may be mounted on a motorized slide (not shown in the drawing) designed to reciprocate along an axis parallel to the reel axis 34.

A twist apparatus 40 is advantageously used for de-twisting the fiber, i.e. for removing an undesired elastic twist stored in the fiber 4 when spun. This undesired twist, which tends to generate circular birefringence in the fiber, is produced during spinning of the fiber due to the presence of a fiber rotation constraint downstream the point of spinning.

The twist apparatus 40 may be used at the drawing stage, in particular to de-twist the fiber 4 during winding thereof, or it may be used at a subsequent stage, for example during unwinding of the fiber 4 for re-spooling it on a bobbin suitable for shipment, as will be described in the following.

Figure 9:
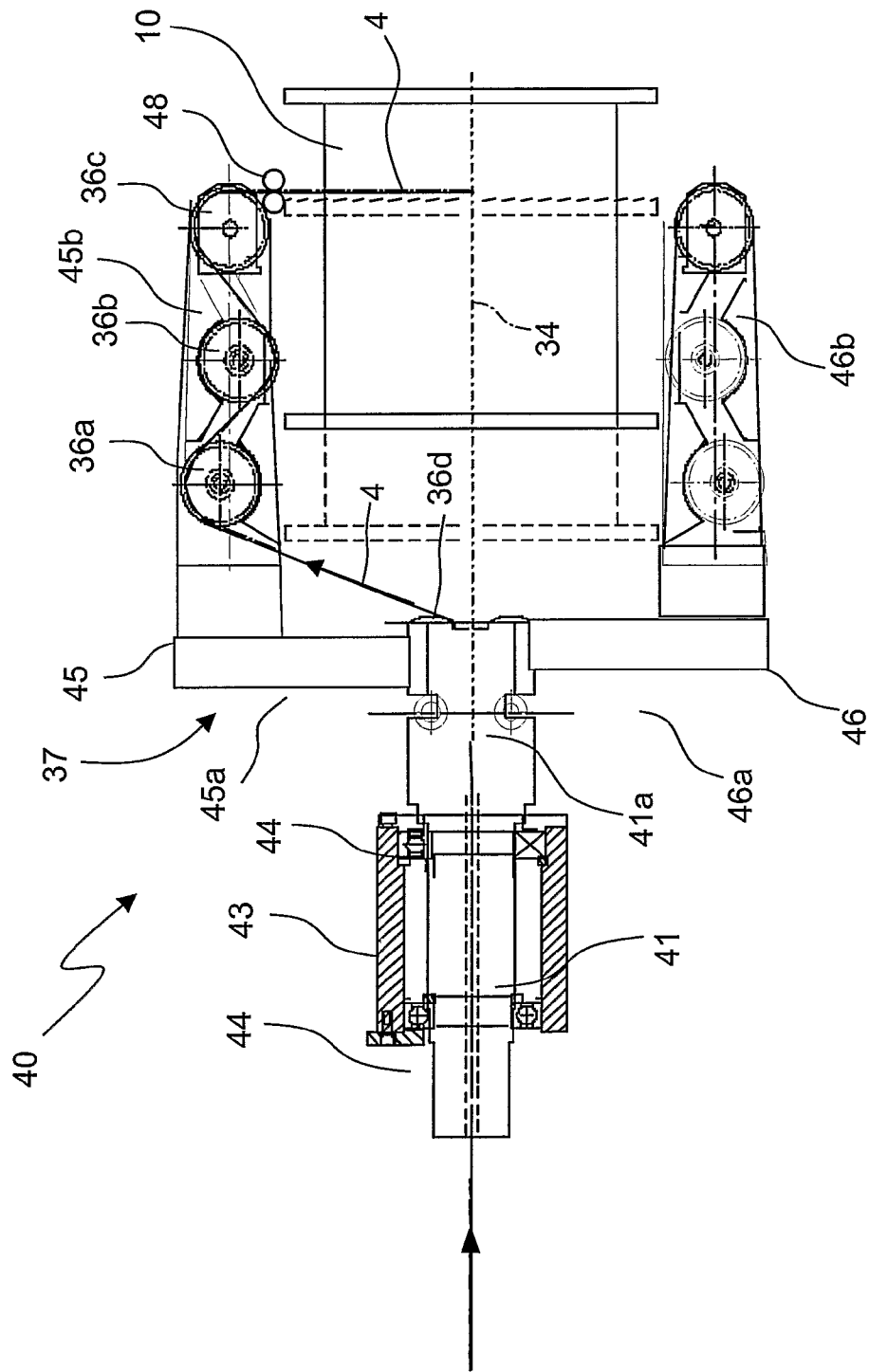
FIG. 9 shows a twist apparatus suitable to be used in the drawing tower of FIG. 7.

In practice, the twist apparatus 40 expressly applies to the fiber a twist (which will be called "de-twist") in a direction opposite that of the undesired elastic twist resulting from spinning. In the following, with "direction opposite to the direction of spin", referred to the direction of the de-twist, it will be intended the direction opposite to the direction of the twist resulting from spinning. The twist apparatus 40 may advantageously be integrated in the winding device 9 of the drawing tower 1. In particular, the support member 37 and the pulleys 36a, 36b, 36c, 36d may be part of the twist apparatus 40. With reference to FIG. 9, which illustrates one possible embodiment of the twist apparatus 40, the support member 37 is a rotating member having the shape of a two-prongs fork and comprising a hollow spindle 41 and a first and a second arms 45, 46 extending from one end 41a of the hollow spindle 41. The spindle 41 is held coaxial to the axis 34 by a fixed frame 43 and is rotatably mounted thereon through bearings 44. The spindle 41 is driven by a DC motor (not shown in the drawing) through a belt transmission (also not shown in the drawing). In use, the spindle 41 is designed to be passed through by the fiber 4 along the axis 34.

The first and second arms 45, 46 are symmetrical to each other with respect to the axis 34 and have respective first portions 45a, 46a rigidly connected to the spindle 41 and extending away from the axis 34 opposite to each other, and respective second portions 45b, 46b parallel to the axis 34. The first portions 45a, 46a have a radial extension greater than the radius of the reel 10, and the second portions 45b, 46b have a length corresponding substantially to the length of the reel 10. The reel 10 is located between the second portions 45b, 46b of the arms 45, 46.

The first pulley 36a is positioned at the end of the spindle 41 facing the reel 10, and is designed to deviate the fiber 4 to the first arm 45. The second, third and fourth pulleys 36b, 36c, 36d are positioned along the second portion 45b of the first arm 45 and define a wavy path for the fiber 4 before it is fed to the reel 10. The function of the third pulley 36c (which is intermediate between the second pulley 36b and the fourth pulley 36d) is to avoid that the fiber 4 slips from pulleys 36b and 36d, and it might be dispensed for. The second arm 46 has only a balancing function and may carry three pulleys identical to pulleys 36b, 36c, 36d, to have the same distribution of weights as the first arm 45.

While the first, second and third pulleys 36a, 36b, 36c preferably have the respective axes parallel to each other and perpendicular to the axis 34, the fourth pulley 36d is preferably tilted about an axis parallel to the axis 34, of such an angle that it lies on a plane that is tangent to the fiber bobbin when the reel 10 is half filled.

The twist apparatus 40 preferably comprises a fiber position sensor 48 (for example a device model Keyence FS-V11P FU-35FA) positioned between the fourth pulley 36d and the reel 10, to provide a control signal for the alternate axial motion of the reel 10 (FIG. 9 shows, for example, two different positions of reel 10) or of the support member 37. In fact, as previously stated, a relative alternate motion shall be provided between the reel 10 and the support member 37 to allow helix winding of the fiber 4.

The drawing tower 1 may further comprise a control unit (not shown in the drawing), electrically connected to all the devices of the tower 1 to be controlled from the outside, and to all the sensors and the detectors present along the tower 1.

The drawing tower 1 operates as follows.

The supporting device 7 feeds the preform 3 to the furnace, where a lower portion thereof (the neckdown) is melted. The fiber 4 drawn from the neckdown is pulled down from the traction device 8 and wound onto the reel 10 by the winding device 9. Between the capstan 18 and the reel 10, the tension-control device 30 regulates the tension of the fiber 4.

As the fiber 4 is drawn, the sensors 13 and 14 monitor its tension and diameter. Such monitoring can be used to control the drawing process, for example by acting on the traction speed. When exiting the furnace 6, the fiber 4 is cooled by the cooling device 12 and it is coated with two protective layers by the coating devices 15, 16.

The coated fiber 4 is then subjected to a unidirectional and substantially constant spin by the spinning device 20. This is obtained by setting into rotation the rotating member 23 about the axis 2 at a constant speed. Each turn of the rotating member corresponds to one turn of the fiber 4 about its axis.

The spin rate is selected in such a way that the effects of the imperfections and irregularities of the fiber 4 are rendered substantially uniform in a length of the fiber 4 equal to at least the shortest typical beat length $L_B$. As a result, when signals are transmitted into the fiber, there is an exchange of power between the fundamental propagation modes and, therefore, a reduction of the PMD. Thus, it is possible to significantly reduce the negative effects caused by the asymmetric stress conditions and by the imperfections of shape intrinsically present in the fiber 4.

The Applicant has observed that the higher the spin rate, the better the performances of the fiber in terms of PMD. However, the higher the spin rate, the higher the elastic twist to be removed. The Applicant has verified that a spin rate between 1 and 8 turns/m allows reducing the PMD at acceptable values and at the same time introduces an amount of elastic twist that can be efficiently removed by the technique here described.

When spun, the fiber 4 transmits a corresponding torque upstream and downstream. Upstream, the torque is transmitted to the preform neckdown, where the plastic deformation of the melted glass "absorbs" the torque and "transforms" it into an intrinsic orientation of the birefringence axes of the fiber 4. This intrinsic torsion is frozen into the fiber 4 as the fiber cools. Downstream, in the absence of any countermeasure, the torque would be transmitted as far as the reel 10, where the fiber 4, once wound, would keep a residual elastic twist. This elastic twist would introduce, if not controlled, an undesired circular birefringence in the fiber 4.

In order to control the residual twist in the wound fiber 4, the fiber 4 is de-twisted by the twist apparatus 40. In practice, the rotating support member 37 is made to rotate about the axis 34, in a sense opposite to the spinning sense (more precisely, as previously stated, in a sense opposite to that of the elastic twist generated by spinning). Each turn of the support member 37 about the axis 34 corresponds to one turn of the fiber 4 about its axis. The torque transmitted along the fiber 4 downstream the spinning device 20 is then at least reduced by the twist apparatus 40 before the fiber is wound onto the reel 10.

In detail, the fiber 4, after passing through the spindle 41, is deviated by the first pulley 36a towards the first arm 45, is herein conveyed along the second portion 45b with the required tension by the second and third pulleys 36b, 36c, and is finally fed to the reel 10 by the fourth pulley 36d, in a direction substantially perpendicular to the axis 34. While being rotated about the axis 34, the reel 10 is also reciprocated along the axis 34, so as to allow an helical winding of the fiber 4.

The signal of the sensor 48 is used to control the speed of the alternate motion of the reel 10, so that the fiber 4 is always made to pass in a predetermined position of the sensor 48.

The Applicant has found that the PMD of the fiber 4 can be reduced to a minimum by imparting to the fiber, after it has been spun, a twist that not only removes the elastic twist generated by the spinning action, but also introduces a positive residual twist, i.e. a twist in the opposite sense. The Applicant has verified that a positive residual twist between 0 and 1.5 turns/m, preferably between 0.3 and 1 turns/m, allows reducing the PMD of spun fibers in a wide range of spin rates, at least up to 8 turns/m.

As previously stated, fiber de-twisting may be performed, instead of during the drawing process, at a stage subsequent to drawing, and may be associated with the operation of unwinding of the fiber 4 from reel 10. For example, de-twisting may be performed during re-spooling of the fiber 4 onto a shipping spool to be shipped to a customer or during screening operations. Screening is a test operation, performed on an optical fiber to check the strength thereof, which comprises applying a predetermined longitudinal tension to the fiber 4 while it runs in a predetermined path, usually defined by pulleys.

As shown in FIG. 10, the twist apparatus 40 may for example be used with the fiber 4 moving in the opposite direction, so as to perform fiber de-twisting while the fiber 4 is unwound. In particular, FIG. 10 illustrates a re-spooling assembly 70 comprising an unwinding device 9' for unwinding the fiber 4 from the reel 10 and a further winding device 71, including guiding pulleys 73, for re-winding the fiber 4 onto a different reel 74. The unwinding device 9' substantially corresponds to winding device 9, but operates in the opposite direction, to unwind the fiber 4. In this case, the twist apparatus 40 is integrated in the unwinding device 9' for de-twisting the fiber 4 as it is unwound from the reel 10. The re-spooling assembly 70 may also comprise a screening device 72, for example of the type described in U.S. Pat. No. 5,076,104.

FIG. 11 shows a different embodiment of the twist apparatus, indicated with reference numeral 50. The twist apparatus 50 comprises a fixed frame 51 supporting the reel 10 along the axis 34, and a rotating member 52 for twisting the fiber 4 as it is wound onto the reel 10 or unwound therefrom.

The rotating member 52 comprises a first and a second spindles 53, 54, supported by the frame 51 coaxially to the axis 34, and a flexible arch member 55 connecting the two spindles 53, 54 over the reel 10, for the passage of the fiber 4.

The fixed frame 51 comprises two external support members 56, 57 and two internal support members 58, 59 substantially aligned to each other along the axis 34. The external support members 56, 57 are cylindrical and the member 57 has an internal passage for the fiber 4, along the axis 34. The reel 10 is positioned between the internal support members 58, 59 and it is supported thereby. The reel 10 is connected to a motor (not shown in the drawing) through a belt transmission 60.

The spindles 53, 54 are opposite to each other with respect to the reel 10 and are connected to a same motor (different from that of the reel 10 and not shown in the drawing) through respective belt transmissions 62 (only one of which is illustrated), so that they can be rotated at a same speed. Each of the spindles 53, 54 is positioned between a corresponding external support member 56, 57 and a corresponding internal support member 58, 59. The first spindle 53 carries internally a pulley 67 tangent to the axis 34 that allows the passage of the fiber 4 between the arch member 55 and a further pulley 69 tangent to the axis 34 carried by the internal support member 58. The second spindle 54 carries internally a further pulley 68 tangent to the axis 34 allowing the passage of the fiber 4 between the external support member 57 and the arch member 55. One or more further pulleys are provided for guiding the fiber to or from the reel 10.

The flexible arch member 55 is preferably made of carbonium and forms a bridge over the reel 10 for the passage of the fiber 4 between the spindles 53, 54. The arch member 55 may be provided with equidistant guiding U-bolts 61, preferably made of ceramic and suitable to guide the fiber 4 along the arch member 55. Alternatively, the arch member 55 may be provided with a guiding tube (not shown in the drawing), which offers the advantage of an easier set-up before the process start, allowing blowing of the fiber 4 from one end to the other of the arch member 55.

The apparatus 50 is herein below described when operating for winding the fiber onto the reel 10. Similarly to the apparatus 40, the apparatus 50 may operate in the opposite direction to unwind the fiber 4 from the reel 10, for example in the re-spooling assembly 70 of FIG. 10.

The fiber 4 is received through the member 57 and a first portion of the second spindle 54, where it is deviated by the pulley 68 to the arch member 55; the fiber 4 then runs over the entire arch member 55 and enters the first spindle 53, where it is further deviated by the pulley 67 towards the internal support member 58 along the axis 34; then, the fiber is further deviated by the pulley 69 and it is finally fed to the reel 10.

The amount of twist to be applied to the optical fiber 4 for obtaining the desired amount of residual twist may be determined according to the following technique. In a first step, a test fiber section only subjected to spin is drawn. This test fiber section can be obtained, for example, by operating the drawing tower 1 of FIG. 7 with the twist apparatus 40 off (i.e. with the rotating member 37 in a staying condition) for a predetermined time. Then, the residual twist accumulated in the test fiber section wound on the reel 10 is measured in the following way.

The reel 10 is hanged on a support located at a predetermined height, for example at 2 m above ground. A corresponding length of fiber is unwound from the reel 10, keeping it under a moderate tension. The upper end of the unwound fiber section is secured to the reel surface, while the free end is marked, for example with a small piece of tape (having a negligible weight) and it is left free to rotate. The measurement resolution depends on the length of the unwound fiber section. For a fiber length of 2 m, the number of turns can be measured with a resolution of about ¼ turns over 2 m, so that a resolution of about 0.125 turns/m can be obtained. If a higher resolution is required, a longer fiber can be used.

The Applicant has observed that the presence of the fiber coating shall be taken into consideration for an accurate measurement of the residual twist due to spinning, since a residual twist is also accumulated in the fiber under the coating. Accordingly, after the residual twist of the coated fiber has been measured in the way previously described, the free end of the coated fiber is blocked and the coating is completely removed (using a conventional Miller stripper). The fiber is then left again free to rotate, and the additional rotation of the fiber is measured with the same resolution as above.

The operation is repeated over consecutive fiber sections of predetermined length, for example every 2 m, to reach a predetermined total measured length, for example between 20 and 60 m. The mean value is used to label the torsion value of the fiber.

After the residual twist due to spinning has been measured, the fiber drawing may be continued with the twist apparatus 40 turned on, suitably set to obtain the desired residual twist.

It is thus possible to obtain an optical fiber having a unidirectional intrinsic spin and an elastic twist equal to zero in module, or opposite to said spin and greater than zero in module.

The unidirectional intrinsic spin may be substantially constant or variable. In this second case, the spin function is preferably obtained by superposing a substantially constant function and a periodic function, and the twist is applied so as to vary the average value of the residual twist to the desired value. The elastic twist applied to the fiber is preferably comprised in module between 0 and about 1.5 turns/m, more preferably between about 0.3 and 1 turns/m.

Fibers with both helicities, clockwise and counter clockwise, are produced by the process previously described by changing the rotation direction of the spinning device and of the twisting device. Once two sets of fibers ($\sigma_+$ and $\sigma_-$) with opposite helicity have been produced, spans of predetermined length of these fibers are used in a cabling process of a known type to produce an optical cable as previously described.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, although in the invention embodiment shown in FIG. 2 a strict alternation of unidirectionally spun fiber spans having mutually opposite spinning helicity is provided for, this is not to be construed as a limitation of the present invention, because an optical fiber link might also be produced by splicing unidirectionally spun optical fiber spans of opposite spinning helicity without necessarily respecting such a strict alternation.

Moreover, the optical fiber link may comprise one or more spans of unspun optical fibers or of alternately spun optical fibers, spliced to the unidirectionally spun fibers or arranged between two spans of unidirectionally spun fiber.

Experimental Results

The Applicant has experimentally confirmed the predicted $PMD_c$ increase in unidirectionally spun fibers.

Figure 12:
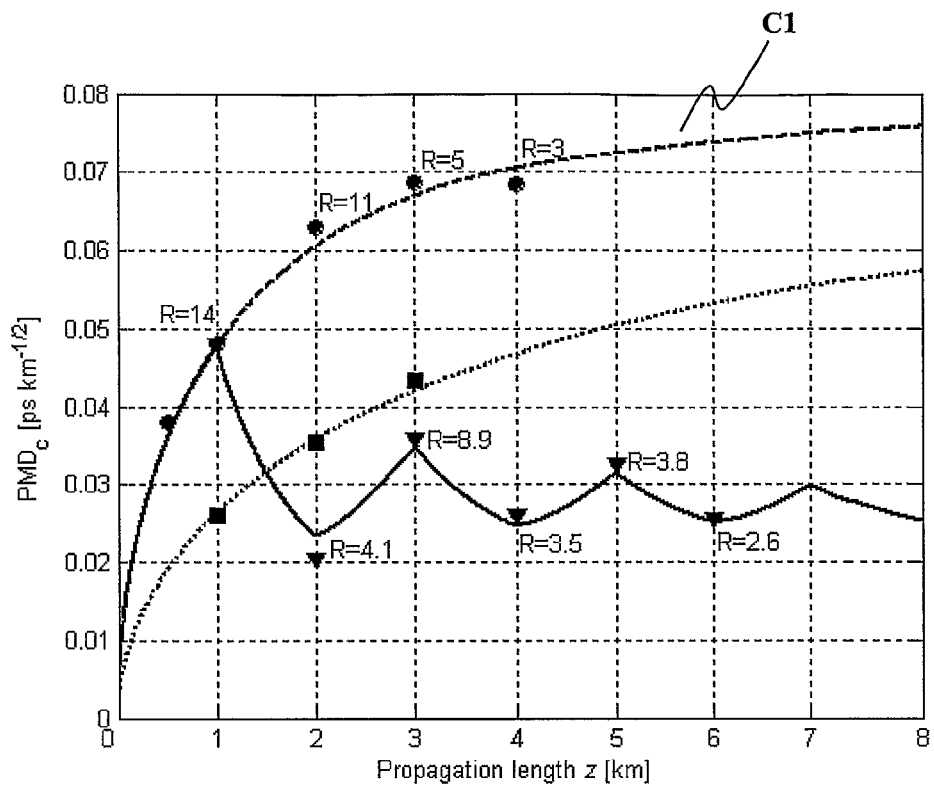
Figure 13A:
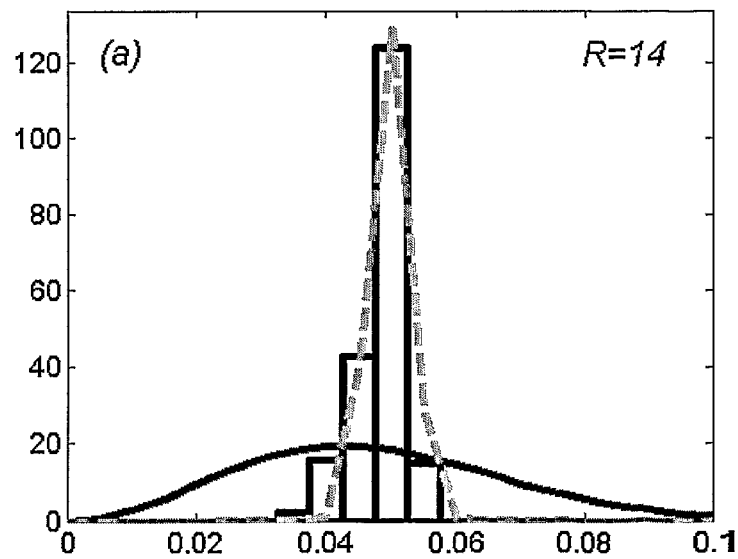

To do this, two G.652 fibers have been drawn at a unidirectional spin rate of +3turns/m and −3turns/m, and completely de-twisted after the drawing process, in order to eliminate any residual elastic twist. The fibers have then be loosely wound about a large diameter bobbin, and, to ensure that all the possible range of DGD values is explored, repeated DGD measurements have been performed, each time slightly perturbing the fiber deployment. In particular, the measure has been realized according to the Jones Matrix Eigenanalysis technique, using a PAT9200 polarimeter and a Tunics-Plus tunable laser. The wavelengths range from 1530 nm to 1620 nm has been scanned using a 10 nm step. Up to 1200 DGD values in one-hour time have been thus obtained. Circles and squares in FIG. 12 shows the measured PMDc as a function of z for the +3turns/m and −3turns/m fibers, respectively: it can be appreciated that the PMDc increases with the propagation distance, and converges to an asymptotic value, in agreement with the predictions reported in the afore-mentioned paper by A. Galtarossa et al. "Polarization mode dispersion properties of constantly spun randomly birefringent fibers", Optics Letters, vol 28 No. 18, September 2003.

The Applicant has also experimentally confirmed the deviation of the DGD statistical distribution from the typical Maxwell distribution that was suggested in the same paper as affecting short spans of unidirectionally spun fibers. Referring to FIGS. 13A to 13D, which show the measured DGD distributions of the +3turns/m fiber of FIG. 12 for z=1,2,3, and 4 km respectively, (in the diagrams, the solid and the dashed lines represent the Maxwell and the Gauss fits, respectively; the x and y axis represent the DGD (in ps) and the counts), it can be appreciated that unidirectional spinning may indeed severely affect the DGD statistics. In particular, for short values of z the DGD distribution is well fitted by a very narrow Gauss curve, with a ratio R (ratio between the expectation value and the standard deviation) much higher than 2.4, which is the R value of the Maxwell distribution. As z increases, the dispersion of the data around the expectation value increases (the ratio R decreases), and at the same time the distribution becomes more and more Maxwell-like.

The Applicant has experimentally confirmed the PMD growth reduction achievable by concatenating fiber spans of opposite helicity. Triangles in FIG. 12 report the experimentally measured $PMD_c$ in fibers made by splicing alternated, 1-Km long spans of unidirectionally spun fiber of opposite helicity. In particular, samples of 1 Km of the aforementioned G.652 have been spliced together, having care to alternate the helicity. It can be appreciated that the PMDc stabilizes to a value of about 0.03 ps/km$^{1/2}$.

The PMDc measured at the splicing points exhibits an oscillating behavior with z, with the minima and the maxima corresponding to an even and to an odd number of spans, respectively. As indicated by the values of the ratio R (reported aside the triangles), the concatenation of an odd number of spans always gives a DGD dispersion greater than the concatenation of an even number. As z increases and the PMDc tends to stabilize, the DGD distribution becomes larger and Maxwell-shaped, and the value of R decreases down to 2.4.

Splicing together alternated fiber spans of 2 Km, the PMDc tends to a value of about 0.04 ps/km$^{1/2}$, while alternating spans of 3 Km does not provide a significant PMDc reduction with respect to the unidirectionally spun fiber. Thus, fiber span length equal to or lower than 1 Km seems to provide good results, at least in the fiber herein considered.

Numerical Results

The Applicant has numerically verified all these experimental observations with a code based on the random modulus model of the fiber birefringence (RMM) and is explained in P. K. A. Wai and C. R. Menyuk, "Polarization Mode Dispersion, Decorrelation, and Diffusion in Optical Fibers with Randomly Varying Birefringence", Journal of Lightwave Technology, Vol. 14, No. 2, February 1996. The simulations confirmed that the PMDc compensation holds for an arbitrary number of alternated spans, so that a fiber of any length with a controlled PMDc value can be manufactured. The shorter the spans length, the smaller the asymptotic PMDc value.

In FIG. 12 the dashed, dotted and solid lines represent the result of RMM numerical simulation of the unidirectional +3turns/m fiber, unidirectional −3turns/m fiber and concatenated alternating helicity (±3turns/m) link, respectively. The fit with experimental data is very good. The fibers parameters used for the simulations are the following:

for the +3turns/m fiber and for the +3 turns/m spans in the alternated-helicity link: $L_B$=4 m, $L_F$=2.34 m;

for the −3 turns/m fiber and for the −3 turns/m spans in the alternated-helicity link: $L_B$=5.6 m, $L_F$=3.45 m.

The invention claimed is:

1. An optical fiber link comprising a plurality of optical fiber spans joined one to the other, said plurality of optical fiber spans comprising at least one first unidirectionally-spun optical fiber span and at least one second unidirectionally-spun optical fiber span having mutually opposite spinning directions, and each fiber span being void of zero spin rate sites, wherein the at least one first unidirectionally-spun optical fiber span is obtained from at least one first unidirectionally-spun optical fiber, the at least second unidirectionally-spun optical fiber span is obtained from at least one second unidirectionally-spun optical fiber, the first and second unidirectionally-spun optical fibers being distinct optical fibers and having mutually opposite helicity.

2. The optical fiber link according to claim 1, wherein the first unidirectionally-spun optical fiber span and the second unidirectionally-spun optical fiber span are joined to each other.

3. The optical fiber link according to claim 1, wherein said plurality of optical fiber spans comprises a plurality of first optical fiber spans, and a plurality of second optical fiber spans, the first optical fiber spans and the second optical fiber spans being spans of unidirectionally spun optical fibers having mutually opposite spinning directions, and wherein the first optical fiber spans and the second optical fiber spans are alternated with each other in the optical fiber link.

4. The optical fiber link according to claim 1, wherein the first unidirectionally-spun optical fiber span and the second unidirectionally-spun optical fiber span have substantially a same span length.

5. The optical fiber link according to claim 1, wherein each of said first and second unidirectionally-spun optical fiber spans have a span length, a spinning period p, a correlation length $L_F$ and a beat length $L_B$, and said span length is lower than 10 times the transient characteristic length $L_T$ defined as $$L_T = L_F\left(1 + \frac{4L_B^2}{p^2}\right).$$

6. The optical fiber link according to claim 4, wherein said span length is equal to or lower than approximately 3 Km.

7. The optical fiber link according to claim 6, wherein said span length is equal to or lower than approximately 1 Km.

8. The optical fiber link according to claim 5, wherein said span length is equal to or lower than approximately 3 Km.

9. The optical fiber link according to claim 1, wherein the first unidirectionally-spun optical fiber span and the second unidirectionally-spun optical fiber span have substantially a same spin rate.

10. The optical fiber link according to claim 3, wherein the number of first optical fiber spans and second optical fiber spans is odd.

11. An optical cable line comprising a plurality of optical cable trunks joined to each other, wherein said plurality of optical cable trunks comprises at least a first optical cable trunk and a second optical cable trunk, the first optical cable trunk comprising a first optical fiber span unidirectionally-spun in a first direction and obtained from a first unidirectionally-spun optical fiber, and the second optical cable trunk comprising a second optical fiber span unidirectionally-spun in a second direction opposite to the first direction and obtained from a second unidirectionally-spun optical fiber, and each fiber span being void of zero spin rate sites, the first and the second optical fiber spans being optically linked to each other.

12. The optical cable line according to claim 11, wherein the first and the second optical fiber spans are joined to each other.

13. The optical cable line according to claim 11, wherein the first and the second optical fiber spans have substantially a same span length.

14. The optical cable line according to claim 11, wherein each of said first and second optical fiber spans have a span length, a spinning period p, a correlation length $L_F$ and a beat length $L_B$, and said span length is lower than 10 times the transient characteristic length $L_T$ defined as $$L_T = L_F\left(1 + \frac{4L_B^2}{p^2}\right).$$

15. The optical fiber link according to claim 13, wherein said span length is equal to or lower than approximately 3 Km.

16. The optical fiber link according to claim 15, wherein said span length is equal to or lower than approximately 1 Km.

17. The optical fiber link according to claim 14, wherein said span length is equal to or lower than approximately 3 Km.

18. The optical cable line according to claim 11, wherein the first and the second optical fiber spans have substantially a same spin rate.

19. The optical cable line according to claim 11, wherein the plurality of optical cable trunks comprise a plurality of first optical fiber spans and a plurality of second optical fiber spans joined to each other to form one optical fiber link, the first optical fiber spans and the second optical fiber spans being unidirectionally-spun optical fibers having mutually opposite spin directions, and wherein the first optical fiber spans and the second optical fiber spans are alternated with each other in the optical fiber link.

20. The optical cable line according to claim 11, wherein at least one optical cable trunk of said plurality of optical cable trunks has an optical core comprising a plurality of unidirectionally-spun optical fiber spans having a same spin direction.

21. The optical cable line according to claim 11, wherein at least one optical cable trunk of said plurality of optical cable trunks has an optical core comprising at least two unidirectionally-spun optical fiber spans having opposite spin directions.

22. The optical cable line according to claim 11, wherein the total number of optical cable trunks is odd.

23. A method of realizing an optical fiber link comprising:
providing at least a first span of optical fiber obtained from at least one first unidirectionally-spun optical fiber unidirectionally-spun in a first direction, the first span being void of zero spin rate sites;
providing at least a second span of optical fiber obtained from at least one second unidirectionally-spun optical fiber unidirectionally-spun in a second direction opposite to the first direction, the second span being void of zero spin rate sites; and
joining the first span and the second span together at a respective end thereof, such that the first and the second span of optical fiber exhibit mutually opposite helicity.

24. A method of producing an optical cable, comprising providing a plurality of optical fibers to a cable manufacturing line, wherein said plurality of optical fibers comprises at least a first optical fiber obtained from a first unidirectionally-spun optical fiber being unidirectionally-spun in a first direction, and at least a second optical fiber obtained from a second unidirectionally-spun optical fiber being unidirectionally-spun in a second direction opposite to the first direction, the first and the second optical fibers being void of zero spin rate sites and exhibiting a mutually opposite helicity.

25. A method of realizing an optical cable line, comprising:
forming a plurality of optical cable trunks, each one comprising at least one optical fiber span; and
joining the optical cable trunks one to another;
the step of forming a plurality of optical cable trunks comprising forming at least one first trunk comprising a first optical fiber span obtained from a first unidirectionally-spun optical fiber unidirectionally-spun in a first direction and being void of zero spin rate sites, and forming at least one second trunk comprising a second optical fiber span obtained from a second unidirectionally-spun optical fiber unidirectionally-spun in a second direction opposite to the first direction and being void of zero spin rate sites, and the step of joining the optical cable trunks one to another comprises optically linking the first optical fiber span to said second optical fiber span.

* * * * *